US008834792B2

(12) United States Patent
Robole et al.

(10) Patent No.: US 8,834,792 B2
(45) Date of Patent: Sep. 16, 2014

(54) SYSTEMS FOR PROCESSING SAMPLE PROCESSING DEVICES

(75) Inventors: Barry W. Robole, Woodville, WI (US); William Bedingham, Woodbury, MN (US); Peter D. Ludowise, Cottage Grove, MN (US); Jeffrey C. Pederson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 12/617,921

(22) Filed: Nov. 13, 2009

(65) Prior Publication Data

US 2011/0117656 A1 May 19, 2011

(51) Int. Cl.

| | |
|---|---|
| ***G01N 9/30*** | (2006.01) |
| ***G01N 21/00*** | (2006.01) |
| ***B01L 3/00*** | (2006.01) |
| *B01L 7/00* | (2006.01) |

(52) U.S. Cl.

CPC ......... *B01L 3/5027* (2013.01); *B01L 2300/046* (2013.01); *B01L 7/52* (2013.01); *A01L 2300/0803* (2013.01); *B01L 2300/1883* (2013.01); *B01L 2300/0861* (2013.01)

USPC ................................. 422/72; 422/63; 422/64

(58) Field of Classification Search

CPC .................. B01L 2400/0409; B01L 2200/027; B01L 2300/0803; B01L 3/50853; B01L 9/52; B01L 3/5021; G01N 35/025; G01N 2035/00326; G01N 2035/00495; B03C 1/30; B01D 3/08; B04B 13/00; B04B 5/0414; B04B 7/00

USPC ................................................ 422/63, 64, 72

See application file for complete search history.

(56) References Cited

U.S. PATENT DOCUMENTS

| | | | |
|---|---|---|---|
| 3,555,284 | A | 1/1971 | Anderson |
| 3,713,124 | A | 1/1973 | Durland et al. |

(Continued)

FOREIGN PATENT DOCUMENTS

| | | |
|---|---|---|
| CA | 2130013 | 3/1999 |
| DE | 3712624 | 11/1988 |

(Continued)

OTHER PUBLICATIONS

*Handbook of Pressure Sensitive Adhesive Technology*, Donatas Satas (Ed.) 2nd Edition, Title page, Publication page, Table of Contents, and p. 172, and Fig. 8-16 on p. 173, Van Nostrand Reinhold, New York, NY 1989.

(Continued)

*Primary Examiner* — Dean Kwak
(74) *Attorney, Agent, or Firm* — Nicole J. Einerson

(57) ABSTRACT

A system and method for processing sample processing devices. The system can include a base plate adapted to rotate about a rotation axis. The system can further include a cover including a first projection, and a housing. A portion of the housing can be movable with respect to the base plate between an open position and a closed position, and can include a second projection. The first projection and the second projection can be adapted to be coupled together when the portion is in the open position and decoupled when the portion is in the closed position. The method can include coupling the cover to the portion of the housing, moving the portion of the housing from the open position to the closed position, and rotating the base plate about the rotation axis.

25 Claims, 6 Drawing Sheets

(56) References Cited

U.S. PATENT DOCUMENTS 3,795,451 A 3/1974 Mailen
3,798,459 A 3/1974 Anderson et al.
3,856,470 A 12/1974 Cullis et al.
3,873,217 A 3/1975 Anderson et al.
3,912,799 A 10/1975 Chisholm
3,964,867 A 6/1976 Berry
4,030,834 A 6/1977 Bauer et al.
4,046,511 A 9/1977 Stabile
4,111,304 A 9/1978 Lucas
4,123,173 A 10/1978 Bullock et al.
4,244,916 A 1/1981 Guigan
4,252,538 A 2/1981 Barr
4,256,696 A 3/1981 Soodak
4,298,570 A 11/1981 Lillig et al.
4,384,193 A 5/1983 Kledzik et al.
4,390,499 A 6/1983 Curtis et al.
4,396,579 A 8/1983 Schroeder et al.
D271,993 S 12/1983 Swartz
4,456,581 A 6/1984 Edelmann et al.
D274,553 S 7/1984 Perry
4,476,733 A 10/1984 Chlosta et al.
4,488,810 A 12/1984 Hatanaka et al.
4,498,896 A 2/1985 Leis
D277,891 S 3/1985 Uffenheimer et al.
4,554,436 A 11/1985 Chlosta et al.
4,580,896 A 4/1986 Brickus et al.
4,632,908 A 12/1986 Schultz
D288,124 S 2/1987 Brickus et al.
4,673,657 A 6/1987 Christian
4,695,430 A 9/1987 Coville et al.
4,766,078 A 8/1988 Gang
4,814,279 A 3/1989 Sugaya
4,839,296 A 6/1989 Kennedy et al.
4,906,432 A 3/1990 Geiselman
4,933,146 A 6/1990 Meyer et al.
4,981,801 A 1/1991 Suzuki et al.
4,990,075 A 2/1991 Wogoman
5,049,591 A 9/1991 Hayashi et al.
5,079,155 A 1/1992 Cox et al.
5,086,337 A 2/1992 Noro et al.
5,128,197 A 7/1992 Kobayashi et al.
5,135,786 A 8/1992 Hayashi et al.
5,139,832 A 8/1992 Hayashi et al.
D329,024 S 9/1992 Marks
5,145,935 A 9/1992 Hayashi
5,149,505 A 9/1992 English et al.
5,154,888 A 10/1992 Zander et al.
5,182,083 A 1/1993 Barker et al.
5,207,987 A 5/1993 Kureshy et al.
5,217,572 A * 6/1993 Guy et al. .................... 159/6.1
5,219,526 A 6/1993 Long
5,229,297 A 7/1993 Schnipelsky et al.
5,242,370 A * 9/1993 Silver et al. .................... 494/11
5,254,479 A 10/1993 Chemelli
5,258,163 A 11/1993 Krause et al.
5,264,184 A 11/1993 Aysta et al.
5,278,377 A 1/1994 Tsai
5,281,516 A 1/1994 Stapleton et al.
5,288,463 A 2/1994 Chemelli
5,310,523 A 5/1994 Smethers et al.
5,336,467 A 8/1994 Heidt et al.
5,411,065 A 5/1995 Meador et al.
5,415,839 A 5/1995 Zaun et al.
5,422,271 A 6/1995 Chen et al.
5,429,810 A 7/1995 Knaepler et al.
5,438,128 A 8/1995 Nieuwkerk et al.
5,439,649 A 8/1995 Tseung et al.
5,446,270 A 8/1995 Chamberlain et al.
5,460,780 A 10/1995 Devaney, Jr. et al.
5,461,134 A 10/1995 Leir et al.
5,464,541 A 11/1995 Aysta et al.
5,496,518 A 3/1996 Arai et al.
5,496,520 A 3/1996 Kelton et al.
5,525,514 A 6/1996 Jacobs et al.
5,527,931 A 6/1996 Rich et al.
5,529,708 A 6/1996 Palmgren et al.
5,571,410 A 11/1996 Swedberg et al.
5,578,270 A 11/1996 Reichler et al.
5,587,128 A 12/1996 Wilding et al.
5,593,838 A 1/1997 Zanzucchi et al.
5,599,501 A 2/1997 Carey et al.
5,601,141 A 2/1997 Gordon et al.
5,604,130 A 2/1997 Warner et al.
5,616,301 A 4/1997 Moser et al.
5,637,469 A 6/1997 Wilding et al.
5,639,428 A 6/1997 Cottingham
5,639,810 A 6/1997 Smith, III et al.
5,691,208 A 11/1997 Miltenyi et al.
RE35,716 E 1/1998 Stapleton et al.
5,720,923 A 2/1998 Haff et al.
5,721,123 A 2/1998 Hayes et al.
5,726,026 A 3/1998 Wilding et al.
5,792,372 A 8/1998 Brown et al.
5,795,547 A * 8/1998 Moser et al. .................... 422/64
5,800,785 A 9/1998 Bochner
5,804,141 A 9/1998 Chianese
5,811,296 A 9/1998 Chemelli et al.
5,819,842 A 10/1998 Potter et al.
5,822,903 A 10/1998 Davis, Sr.
5,833,923 A 11/1998 McClintock et al.
5,856,194 A 1/1999 Arnquist et al.
5,863,502 A 1/1999 Southgate et al.
5,863,801 A 1/1999 Southgate et al.
5,869,002 A 2/1999 Limon et al.
5,876,675 A 3/1999 Kennedy
5,886,863 A 3/1999 Nagasaki et al.
5,922,617 A 7/1999 Wang et al.
5,925,455 A 7/1999 Bruzzone et al.
5,948,227 A 9/1999 Dubrow
5,976,468 A 11/1999 Godec et al.
5,997,818 A 12/1999 Hacker et al.
6,001,643 A 12/1999 Spaulding
6,007,690 A 12/1999 Nelson et al.
6,007,914 A 12/1999 Joseph et al.
6,013,513 A 1/2000 Reber et al.
6,030,581 A 2/2000 Virtanen
6,048,457 A 4/2000 Kopaciewicz et al.
6,063,589 A 5/2000 Kellogg et al.
6,068,751 A 5/2000 Neukermans
6,074,827 A 6/2000 Nelson et al.
6,093,370 A 7/2000 Yasuda et al.
6,103,199 A 8/2000 Bjornson et al.
6,143,247 A 11/2000 Sheppard, Jr. et al.
6,143,248 A 11/2000 Kellogg et al.
6,153,012 A 11/2000 Rupp et al.
6,168,759 B1 1/2001 Green et al.
6,168,948 B1 1/2001 Anderson et al.
6,183,693 B1 2/2001 Bogen et al.
6,184,029 B1 2/2001 Wilding et al.
6,190,617 B1 2/2001 Clark et al.
6,197,595 B1 3/2001 Anderson et al.
6,200,474 B1 3/2001 Kopaciewicz et al.
D441,873 S 5/2001 Köhler
6,265,168 B1 7/2001 Gjerde et al.
6,284,113 B1 9/2001 Bjornson et al.
6,296,809 B1 10/2001 Richards et al.
6,302,134 B1 10/2001 Kellogg et al.
6,306,273 B1 10/2001 Wainright et al.
6,319,469 B1 11/2001 Mian et al.
6,344,326 B1 2/2002 Nelson et al.
6,375,898 B1 4/2002 Ulrich et al.
6,391,264 B2 5/2002 Hammer et al.
6,399,025 B1 6/2002 Chow
6,413,782 B1 7/2002 Parce et al.
6,432,365 B1 8/2002 Levin et al.
6,440,725 B1 8/2002 Pourahmadi et al.
6,450,047 B2 9/2002 Swedberg et al.
6,451,260 B1 9/2002 Düsterhöft et al.
6,461,287 B1 10/2002 Glater
6,465,225 B1 10/2002 Fuhr et al.
6,467,275 B1 10/2002 Ghoshal
6,479,300 B1 11/2002 Jiang et al.
6,527,432 B2 3/2003 Kellogg et al.
6,532,997 B1 3/2003 Bedingham et al.

(56) References Cited

U.S. PATENT DOCUMENTS

| | | | | |
|---|---|---|---|---|
| 6,548,788 | B2 | 4/2003 | Kellogg et al. | |
| 6,558,947 | B1 | 5/2003 | Lund et al. | |
| 6,565,808 | B2 | 5/2003 | Hudak et al. | |
| 6,566,637 | B1 | 5/2003 | Revesz et al. | |
| 6,572,830 | B1 | 6/2003 | Burdon et al. | |
| 6,582,662 | B1 | 6/2003 | Kellogg et al. | |
| 6,593,143 | B1 | 7/2003 | Gordon | |
| 6,617,136 | B2 | 9/2003 | Parthasarathy et al. | |
| 6,627,159 | B1 | 9/2003 | Bedingham et al. | |
| 6,632,399 | B1 | 10/2003 | Kellogg et al. | |
| 6,645,758 | B1 | 11/2003 | Schnipelsky et al. | |
| 6,648,853 | B1 | 11/2003 | McEntee | |
| 6,660,147 | B1 | 12/2003 | Woudenberg et al. | |
| 6,664,104 | B2 | 12/2003 | Pourahmadi et al. | |
| 6,692,596 | B2 | 2/2004 | Moll et al. | |
| 6,706,519 | B1 | 3/2004 | Kellogg et al. | |
| 6,720,187 | B2 | 4/2004 | Bedingham et al. | |
| 6,723,236 | B2 | 4/2004 | Fisk et al. | |
| 6,730,516 | B2 | 5/2004 | Jedrzejewski et al. | |
| 6,734,401 | B2 | 5/2004 | Bedingham et al. | |
| 6,780,818 | B2 | 8/2004 | Gundel et al. | |
| 6,814,935 | B2 | 11/2004 | Harms et al. | |
| 6,824,738 | B1 * | 11/2004 | Neeper et al. | 422/72 |
| 6,889,468 | B2 | 5/2005 | Bedingham et al. | |
| 6,987,253 | B2 | 1/2006 | Bedingham et al. | |
| 7,026,168 | B2 | 4/2006 | Bedingham et al. | |
| 7,144,726 | B2 | 12/2006 | Takagi | |
| 7,164,107 | B2 | 1/2007 | Bedingham et al. | |
| 7,192,560 | B2 | 3/2007 | Parthasarathy et al. | |
| 7,273,591 | B2 | 9/2007 | Sellers et al. | |
| D557,425 | S | 12/2007 | Nakamura et al. | |
| D559,993 | S | 1/2008 | Nagakubo et al. | |
| D559,994 | S | 1/2008 | Nagakubo et al. | |
| D560,284 | S | 1/2008 | Nagakubo et al. | |
| 7,322,254 | B2 | 1/2008 | Bedingham et al. | |
| 7,323,660 | B2 | 1/2008 | Bedingham et al. | |
| 7,332,326 | B1 | 2/2008 | Kellogg et al. | |
| D564,667 | S | 3/2008 | Bedingham et al. | |
| 7,396,508 | B1 | 7/2008 | Richards et al. | |
| 7,435,933 | B2 | 10/2008 | Bedingham et al. | |
| 7,569,186 | B2 | 8/2009 | Bedingham et al. | |
| D600,722 | S | 9/2009 | Yabe et al. | |
| D605,206 | S | 12/2009 | Yabe et al. | |
| 7,628,954 | B2 | 12/2009 | Gomm et al. | |
| 7,754,474 | B2 | 7/2010 | Aysta et al. | |
| 7,763,210 | B2 | 7/2010 | Bedingham et al. | |
| 7,767,937 | B2 | 8/2010 | Bedingham et al. | |
| 2001/0045000 | A1 | 11/2001 | Gundel et al. | |
| 2002/0047003 | A1 | 4/2002 | Bedingham et al. | |
| 2002/0048533 | A1 | 4/2002 | Harms et al. | |
| 2002/0064885 | A1 | 5/2002 | Bedingham et al. | |
| 2002/0097632 | A1 | 7/2002 | Kellogg et al. | |
| 2003/0013203 | A1 | 1/2003 | Jedrzejewski et al. | |
| 2003/0017567 | A1 | 1/2003 | Parthasarathy et al. | |
| 2003/0044322 | A1 | 3/2003 | Andersson et al. | |
| 2003/0053934 | A1 | 3/2003 | Andersson et al. | |
| 2003/0118804 | A1 | 6/2003 | Bedingham et al. | |
| 2003/0120062 | A1 | 6/2003 | Parthasarathy et al. | |
| 2003/0124506 | A1 | 7/2003 | Bedingham et al. | |
| 2003/0138779 | A1 | 7/2003 | Parthasarathy et al. | |
| 2003/0139550 | A1 | 7/2003 | Savu et al. | |
| 2003/0152491 | A1 | 8/2003 | Kellogg et al. | |
| 2003/0152994 | A1 | 8/2003 | Woudenberg et al. | |
| 2003/0155034 | A1 | 8/2003 | De Beukeleer et al. | |
| 2003/0228706 | A1 | 12/2003 | Ramstad et al. | |
| 2003/0231878 | A1 | 12/2003 | Shigeura | |
| 2004/0016702 | A1 | 1/2004 | Hennessy et al. | |
| 2004/0016898 | A1 | 1/2004 | Cox et al. | |
| 2004/0018116 | A1 | 1/2004 | Desmond et al. | |
| 2004/0018117 | A1 | 1/2004 | Desmond et al. | |
| 2004/0023371 | A1 | 2/2004 | Fawcett | |
| 2004/0121471 | A1 | 6/2004 | Dufresne et al. | |
| 2004/0179974 | A1 | 9/2004 | Bedingham et al. | |
| 2004/0209258 | A1 | 10/2004 | Parthasarathy et al. | |
| 2005/0028587 | A1 | 2/2005 | Baer et al. | |
| 2005/0036911 | A1 | 2/2005 | Sellers et al. | |
| 2005/0130177 | A1 | 6/2005 | Bedingham et al. | |
| 2005/0142563 | A1 | 6/2005 | Haddad et al. | |
| 2005/0142570 | A1 | 6/2005 | Parthasarathy et al. | |
| 2005/0142571 | A1 | 6/2005 | Parthasarathy et al. | |
| 2005/0142663 | A1 | 6/2005 | Parthasarathy et al. | |
| 2005/0180890 | A1 | 8/2005 | Bedingham et al. | |
| 2005/0282290 | A1 | 12/2005 | Fujimoto et al. | |
| 2006/0013732 | A1 | 1/2006 | Parthasarathy et al. | |
| 2007/0007270 | A1 | 1/2007 | Bedingham et al. | |
| 2007/0009391 | A1 | 1/2007 | Bedingham et al. | |
| 2007/0010007 | A1 * | 1/2007 | Aysta et al. | 435/287.3 |
| 2007/0132723 | A1 | 6/2007 | Lurz et al. | |
| 2007/0142780 | A1 | 6/2007 | Van Lue | |
| 2008/0050276 | A1 | 2/2008 | Bedingham et al. | |
| 2008/0058991 | A1 | 3/2008 | Lee | |
| 2008/0152546 | A1 | 6/2008 | Bedingham et al. | |
| 2009/0068062 | A1 * | 3/2009 | Jafari et al. | 422/64 |
| 2009/0143250 | A1 | 6/2009 | Lee | |
| 2009/0263280 | A1 | 10/2009 | Bedingham et al. | |
| 2010/0050751 | A1 | 3/2010 | Lee | |
| 2010/0281961 | A1 * | 11/2010 | Saiki et al. | 73/64.56 |
| 2011/0124132 | A1 | 5/2011 | Kim | |

FOREIGN PATENT DOCUMENTS

| | | |
|---|---|---|
| EP | 0 281 368 | 9/1988 |
| EP | 0169306 | 5/1990 |
| EP | 0402994 | 11/1994 |
| EP | 0693560 | 1/1996 |
| EP | 0807486 | 11/1997 |
| EP | 0 965 388 | 12/1999 |
| EP | 0 807 468 | 12/2001 |
| EP | 0810030 | 3/2003 |
| EP | 1 010 979 | 10/2003 |
| JP | 60-57259 | 4/1985 |
| JP | 9-72912 | 3/1997 |
| JP | 11124419 | 5/1999 |
| JP | 2003-504637 | 2/2003 |
| JP | 2004-525339 | 8/2004 |
| JP | 2005-514014 | 5/2005 |
| JP | 2005-274241 | 10/2005 |
| JP | 2009-216395 | 9/2009 |
| WO | 91/19567 | 12/1991 |
| WO | 94/26414 | 11/1994 |
| WO | 94/29400 | 12/1994 |
| WO | 95/18676 | 7/1995 |
| WO | 95/19781 | 7/1995 |
| WO | 96/15576 | 5/1996 |
| WO | 96/34028 | 10/1996 |
| WO | 96/34029 | 10/1996 |
| WO | 96/35458 | 11/1996 |
| WO | 96/41864 | 12/1996 |
| WO | 97/00230 | 1/1997 |
| WO | 97/21090 | 6/1997 |
| WO | 97/46707 | 12/1997 |
| WO | 98/04909 | 2/1998 |
| WO | 98/07019 | 2/1998 |
| WO | 98/49340 | 11/1998 |
| WO | 98/50147 | 11/1998 |
| WO | 98/53311 | 11/1998 |
| WO | 99/09394 | 2/1999 |
| WO | 99/15876 | 4/1999 |
| WO | 99/15888 | 4/1999 |
| WO | 99/40174 | 8/1999 |
| WO | 99/44740 | 9/1999 |
| WO | 99/46591 | 9/1999 |
| WO | 99/55827 | 11/1999 |
| WO | 99/58245 | 11/1999 |
| WO | 99/67639 | 12/1999 |
| WO | 00/05582 | 2/2000 |
| WO | 00/40750 | 7/2000 |
| WO | 00/45180 | 8/2000 |
| WO | 00/50172 | 8/2000 |
| WO | 00/50642 | 8/2000 |
| WO | 00/62051 | 10/2000 |
| WO | 00/68336 | 11/2000 |
| WO | 00/69560 | 11/2000 |
| WO | 00/78455 | 12/2000 |

(56) References Cited

FOREIGN PATENT DOCUMENTS

| | | |
|---|---|---|
| WO | 00/79285 | 12/2000 |
| WO | 01/06228 | 1/2001 |
| WO | 01/07892 | 2/2001 |
| WO | 01/12327 | 2/2001 |
| WO | 01/30995 | 5/2001 |
| WO | 01/38865 | 5/2001 |
| WO | 02/00347 | 1/2002 |
| WO | 03/054509 | 7/2003 |
| WO | 03/054510 | 7/2003 |
| WO | 03/058224 | 7/2003 |
| WO | 03/058253 | 7/2003 |
| WO | 03/093836 | 11/2003 |
| WO | 03/104783 | 12/2003 |
| WO | 2004/010760 | 2/2004 |
| WO | 2004/011142 | 2/2004 |
| WO | 2004/011143 | 2/2004 |
| WO | 2004/011147 | 2/2004 |
| WO | 2004/011148 | 2/2004 |
| WO | 2004/011149 | 2/2004 |
| WO | 2004/011365 | 2/2004 |
| WO | 2004/011592 | 2/2004 |
| WO | 2004/011681 | 2/2004 |
| WO | 2004/094672 | 11/2004 |
| WO | 2005/005045 | 1/2005 |
| WO | 2005/016532 | 2/2005 |
| WO | 2007/005810 | 1/2007 |
| WO | 2007/005853 | 1/2007 |
| WO | 2008/134470 | 11/2008 |
| WO | WO 2009057267 A1 * | 5/2009 |

OTHER PUBLICATIONS

*Handbook of Pressure Sensitive Adhesive Technology*, 3rd Edition, Title page, Publication page, Table of Contents, and pp. 508-517.

Litton Product Brochure; Poly Scientific EC3848 High Speed Slip Ring Capsule; Blacksburg, VA; 2 pgs (Oct. 1999).

Meridian Laboratory Datasheet [online]; Rotocon high performance rotary electrical contacts; 5 pgs [retrieved on Jun. 18, 2002]. Retrieved from the Internet: <http://www.meridianlab.com/>.

Meridian Laboratory Datasheet [online]: Model MM Micro-Minature; 5 pgs. [retrieved on Jul. 19, 2001]. Retrieved from the Internet: <http://www.meridianlab.com/mm.htm>.

Motion Technology Product Guide; Commercial and Military/Aerospace Applications; Blacksburg, VA; 8 pgs. (Jul. 1999).

Nist Grant, Project Brief [online]; ATools for DNA Diagnostics (Oct. 1998) Integrated, Micro-Sample Preparation System for Genetic Analysis,@ [retrieved on Aug. 5, 2002] 2 pgs. Retrieved form the internet at <http://jazz.nist.gov/atpcf/prjbriefs/prjbrief.cfm?ProjectNumber=98-08-0031>.

*Test Methods for Pressure Sensitive Adhesive Tapes*, Pressure Sensitive Tape Council, (1996) (4 pgs).

Sambrook et al., Molecular Cloning, A laboratory Manual, 2nd Edition, Cold Spring Harbor Laboratory, 1989 (30 pgs) includes Title and copyright pages and Table to Contents.

Emmer, A. et al.; "Wall deactivation with fluorosurfactants for capillary electrophoretic analysis of biomolecules"; Electrophoresis 2001, 22; pp. 660-665.

Garcia, A. et al.; "Comparison of Two Leukocyte Extraction Methods for Cytomegalovirus Antigenemia Assay"; Journal of Clinical Microbiology, Jan. 1996; vol. 34, No. 1; pp. 182-184.

U.S. Appl. No. 60/237,151, filed Oct. 2, 2000.

International Search Report PCT/US2009/064365 Jul. 28, 2010, 5 pgs.

Chiou et al., "A Closed-Cycle Capillary Polymerase Chain Reaction Machine", Analytical Chemistry, vol. 73, No. 9, May 1, 2001, 2018-2021.

The People's Republic of China Search Report, Oct. 30, 2013, 3 pages.

* cited by examiner

SYSTEMS FOR PROCESSING SAMPLE PROCESSING DEVICES

FIELD

The present disclosure relates to systems and methods for using rotating sample processing devices to, e.g., amplify genetic materials, etc.

BACKGROUND

Many different chemical, biochemical, and other reactions are sensitive to temperature variations. Examples of thermal processes in the area of genetic amplification include, but are not limited to, Polymerase Chain Reaction (PCR), Sanger sequencing, etc. One approach to reducing the time and cost of thermally processing multiple samples is to use a device including multiple chambers in which different portions of one sample or different samples can be processed simultaneously. Examples of some reactions that may require accurate chamber-to-chamber temperature control, comparable temperature transition rates, and/or rapid transitions between temperatures include, e.g., the manipulation of nucleic acid samples to assist in the deciphering of the genetic code. Nucleic acid manipulation techniques include amplification methods such as polymerase chain reaction (PCR); target polynucleotide amplification methods such as self-sustained sequence replication (3SR) and strand-displacement amplification (SDA); methods based on amplification of a signal attached to the target polynucleotide, such as "branched chain" DNA amplification; methods based on amplification of probe DNA, such as ligase chain reaction (LCR) and QB replicase amplification (QBR); transcription-based methods, such as ligation activated transcription (LAT) and nucleic acid sequence-based amplification (NASBA); and various other amplification methods, such as repair chain reaction (RCR) and cycling probe reaction (CPR). Other examples of nucleic acid manipulation techniques include, e.g., Sanger sequencing, ligand-binding assays, etc.

Some systems used to process rotating sample processing devices are described in U.S. Pat. No. 6,889,468 titled MODULAR SYSTEMS AND METHODS FOR USING SAMPLE PROCESSING DEVICES and U.S. Pat. No. 6,734,401 titled ENHANCED SAMPLE PROCESSING DEVICES SYSTEMS AND METHODS (Bedingham et al.).

SUMMARY

Some embodiments of the present disclosure provide a system for processing sample processing devices. The system can include a base plate operatively coupled to a drive system and having a first surface, wherein the drive system rotates the base plate about a rotation axis, and wherein the rotation axis defines a z-axis. The system can further include a cover adapted to be positioned facing the first surface of the base plate. The cover can include a first projection. The system can further include a housing comprising a portion movable with respect to the base plate between an open position in which the cover is not coupled to the base plate and a closed position in which the cover is coupled to the base plate. The portion can include a second projection. The first projection and the second projection can be adapted to be coupled together when the portion is in the open position and decoupled from each other when the portion is in the closed position, such that the cover is rotatable with the base plate about the rotation axis when the portion is in the closed position and when the cover is coupled to the base plate. The system can further include a sample processing device comprising at least one process chamber and adapted to be positioned between the base plate and the cover. The sample processing device can be rotatable with the base plate about the rotation axis when the sample processing device is coupled to the base plate.

Some embodiments of the present disclosure provide a method for processing sample processing devices. The method can include providing a base plate operatively coupled to a drive system and having a first surface, providing a cover adapted to be positioned facing the first surface of the base plate, and providing a housing. The housing can include a portion movable with respect to the base plate between an open position in which the cover is not coupled to the base plate and a closed position in which the cover is coupled to the base plate. The method can further include positioning a sample processing device on the base plate. The sample processing device can include at least one process chamber. The method can further include coupling the cover to the portion of the housing when the portion of the housing is in the open position, and moving the portion of the housing from the open position to the closed position. The method can further include coupling the cover to the base plate at least partially in response to moving the portion of the housing from the open position to the closed position. The method can further include rotating the base plate about a rotation axis, wherein the rotation axis defines a z-axis.

Other features and aspects of the present disclosure will become apparent by consideration of the detailed description and accompanying drawings.

DETAILED DESCRIPTION

Figure 1:
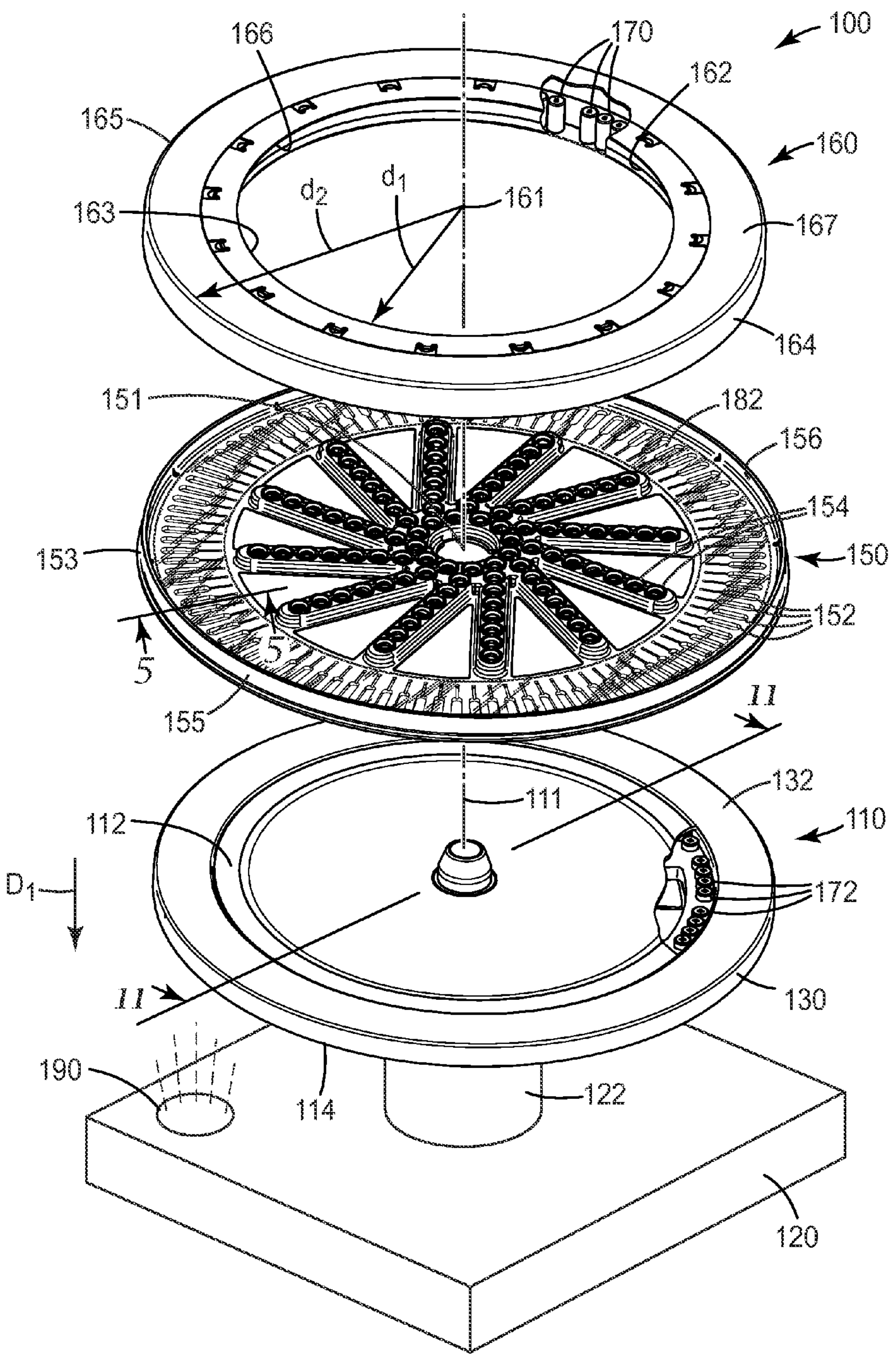
FIG. 1 is an exploded perspective view of an assembly according to one embodiment of the present disclosure, the system including a cover, a sample processing device, and a base plate.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," and "coupled" and variations thereof are used broadly and encompass both direct and indirect connections and couplings. Further, "connected" and "coupled" are not restricted to physical or mechanical connections or couplings. It is to be understood that other embodiments may be utilized, and structural or logical changes may be made without departing from the scope of the present disclosure. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to systems and methods for sample processing devices. Such systems can include means for holding, rotating, thermally controlling and/or accessing portions of a sample processing device. In addition, systems and methods of the present disclosure can provide or facilitate positioning a sample processing device in a desired location of the system, for example, for conducting an assay of interest, and/or removing the sample processing device from the system, for example, when an assay of interest is complete. Furthermore, systems and methods of the present disclosure can facilitate such positioning or removal of a sample processing device without the need for additional tools or equipment.

In some embodiments of systems and methods of the present disclosure, the system can include an annular compression system, which can include an open area (e.g., an open central area), such that the annular compression system can perform and/or facilitate the desired thermal control and rotation functions for the sample processing device, while allowing access to at least a portion of the sample processing device. For example, some systems of the present disclosure cover a top surface of a sample processing device in order to hold the sample processing device onto a rotating base plate and/or to thermally control and isolate portions of the sample processing device (e.g., from one another and/or ambience). However, other systems of the present disclosure (e.g., annular compression systems and methods) can provide the desired positioning and holding functions as well as the desired thermal control functions, while also allowing a portion of the sample processing device to be exposed to other devices or systems for which it may be desirable to have direct access to the sample processing device. For example, in some embodiments, sample delivery (e.g., manual or automatic pipetting) can be accomplished after the sample processing device has already been positioned between an annular cover and a base plate. By way of further example, in some embodiments, a portion of the sample processing device can be optically accessible (e.g., to electromagnetic radiation), for example, which can enable more efficient laser addressing of the sample processing device, or which can be used for optical interrogation (e.g., absorption, reflectance, fluorescence, etc.). Such laser addressing can be used, for example, for fluid (e.g., microfluidic) manipulation of a sample in the sample processing device.

Furthermore, in some embodiments, annular compression systems and methods of the present disclosure can enable unique temperature control of various portions of a sample processing device. For example, fluid (e.g., air) can be moved over an exposed surface of the sample processing device in areas that are desired to be rapidly cooled, while the areas that are desired to be heated or maintained at a desired temperature can be covered and isolated from other portions of the sample processing device and/or from ambience.

In addition, in some embodiments, systems and methods of the present disclosure can allow a portion of the sample processing device to be exposed to interact with other (e.g., external or internal) devices or equipment, such as robotic workstations, pipettes, interrogation instruments, and the like, or combinations thereof. Similarly, the systems and methods of the present disclosure can protect desired portions of the sample processing device from contact.

As a result, "accessing" at least a portion of a sample processing device can refer to a variety of processing steps and can include, but is not limited to, physically or mechanically accessing the sample processing device (e.g., delivering or retrieving a sample via direct or indirect contact, moving or manipulating a sample in the sample processing device via direct or indirect contact, etc.); optically accessing the sample processing device (e.g., laser addressing); thermally accessing the sample processing device (e.g., selectively heating or cooling an exposed portion of the sample processing device); and the like; and combinations thereof.

The present disclosure provides methods and systems for sample processing devices that can be used in methods that involve thermal processing, e.g., sensitive chemical processes such as polymerase chain reaction (PCR) amplification, transcription-mediated amplification (TMA), nucleic acid sequence-based amplification (NASBA), ligase chain reaction (LCR), self-sustaining sequence replication, enzyme kinetic studies, homogeneous ligand binding assays, and more complex biochemical or other processes that require precise thermal control and/or rapid thermal variations. The sample processing systems are capable of providing simultaneous rotation of the sample processing device in addition to effecting control over the temperature of sample materials in process chambers on the devices.

Some examples of suitable sample processing devices that may be used in connection with the methods and systems of the present disclosure may be described in, e.g., commonly-assigned U.S. Patent Publication No. 2007/0010007 titled SAMPLE PROCESSING DEVICE COMPRESSION SYSTEMS AND METHODS (Aysta et al.); U.S. Patent Publication No. 2007/0009391 titled COMPLIANT MICROFLUIDIC SAMPLE PROCESSING DISKS (Bedingham et al.); U.S. Patent Publication No. 2008/0050276 titled MODULAR SAMPLE PROCESSING APPARATUS KITS AND MODULES (Bedingham et al.); U.S. Pat. No. 6,734,401 titled ENHANCED SAMPLE PROCESSING DEVICES SYSTEMS AND METHODS (Bedingham et al.) and U.S. Pat. No. 7,026,168 titled SAMPLE PROCESSING DEVICES (Bedingham et al.). Other useable device constructions may be found in, e.g., U.S. Pat. No. 7,435,933 (Bedingham et al.) titled ENHANCED SAMPLE PROCESSING DEVICES, SYSTEMS AND METHODS; U.S. Provisional Patent Application Ser. No. 60/237,151 filed on Oct. 2, 2000 and entitled SAMPLE PROCESSING DEVICES, SYSTEMS AND METHODS (Bedingham et al.); and U.S. Pat. No. 6,814,935 titled SAMPLE PROCESSING DEVICES AND CARRIERS (Harms et al.). Other potential device constructions may be found in, e.g., U.S. Pat. No. 6,627,159 titled CENTRIFUGAL FILLING OF SAMPLE PROCESSING DEVICES (Bedingham et al.); PCT Patent Publication No. WO 2008/134470 titled METHODS FOR NUCLEIC ACID AMPLIFICATION (Parthasarathy et al.); and U.S. Patent Publication No. 2008/0152546 titled ENHANCED SAMPLE PROCESSING DEVICES, SYSTEMS AND METHODS (Bedingham et al.).

Some embodiments of the sample processing systems of the present disclosure can include base plates attached to a drive system in a manner that provides for rotation of the base plate about an axis of rotation. When a sample processing device is secured to the base plate, the sample processing device can be rotated with the base plate. The base plate can include at least one thermal structure that can be used to heat portions of the sample processing device and may include a variety of other components as well, e.g., temperature sensors, resistance heaters, thermoelectric modules, light sources, light detectors, transmitters, receivers, etc.

Other elements and features of systems and methods for processing sample processing devices can be found in U.S. patent application Ser. No. 12/617,905, filed on even date herewith, which is incorporated herein by reference in its entirety.

Figure 2:
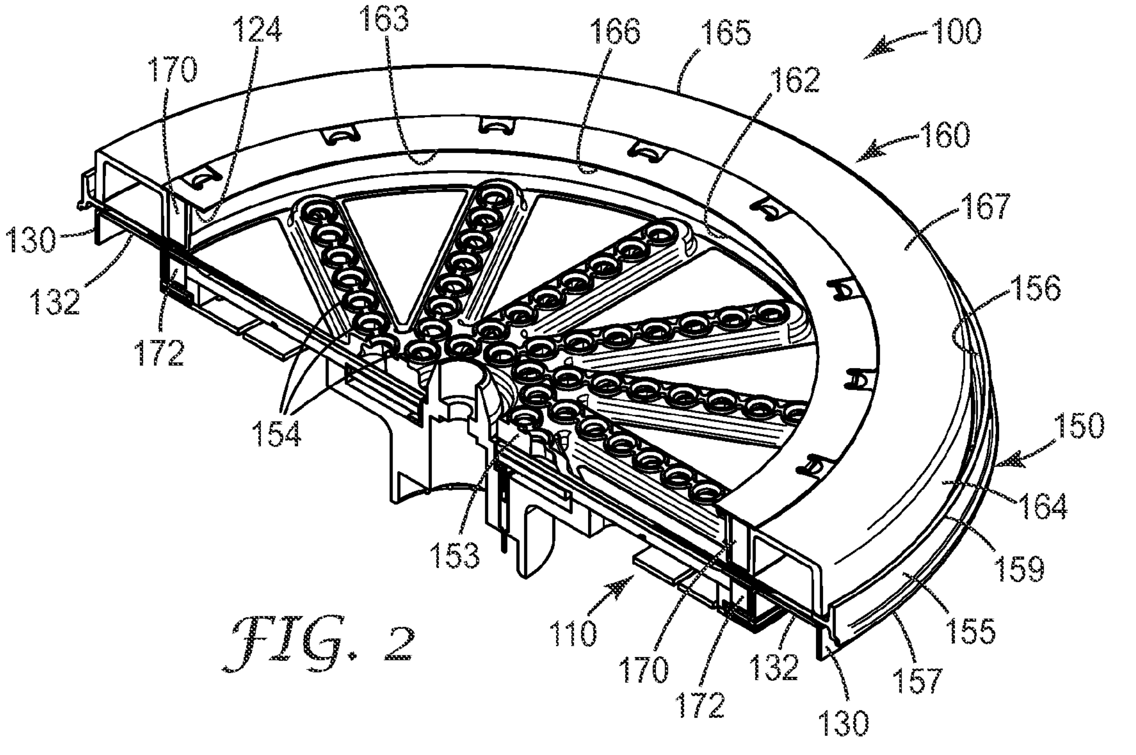
FIG. 2 is an assembled perspective cross-sectional view of the system of FIG. 1.

FIGS. 1-2 illustrate a sample processing assembly 50 that can be used in connection with sample processing systems of the present disclosure. For example, systems of the present disclosure can include the sample processing assembly 50 or portions thereof, and can include other elements as well. FIGS. 3-7 illustrate a system 100 according to one embodiment of the present disclosure that, by way of example only, includes the sample processing assembly 50. Elements and features of the sample processing assembly 50 will be described first below.

As shown in FIGS. 1-2, the assembly 50 can include a base plate 110 that rotates about an axis of rotation 111. The base plate 110 can also be attached to a drive system 120, for example, via a shaft 122. It will, however, be understood that the base plate 110 may be coupled to the drive system 120 through any suitable alternative arrangement, e.g., belts or a drive wheel operating directly on the base plate 110, etc.

As shown in FIGS. 1-2, the assembly 50 can further include a sample processing device 150 and an annular cover 160 that can be used in connection with the base plate 110, as will be described herein. Systems of the present disclosure may not actually include a sample processing device as, in some instances, sample processing devices are consumable devices that are used to perform a variety of tests, etc. and then discarded. As a result, the systems of the present disclosure may be used with a variety of different sample processing devices.

As shown in FIGS. 1-2, the depicted base plate 110 includes a thermal structure 130 that can include a thermal transfer surface 132 exposed on the top surface 112 of the base plate 110. By "exposed" it is meant that the transfer surface 132 of the thermal structure 130 can be placed in physical contact with a portion of a sample processing device 150 such that the thermal structure 130 and the sample processing device 150 are thermally coupled to transfer thermal energy via conduction. In some embodiments, the transfer surface 132 of the thermal structure 130 can be located directly beneath selected portions of a sample processing device 150 during sample processing. For example, in some embodiments, the selected portions of the sample processing device 150 can include one or more process chambers, such as thermal process chambers 152. The process chambers can include those discussed in, e.g., U.S. Pat. No. 6,734,401 titled ENHANCED SAMPLE PROCESSING DEVICES SYSTEMS AND METHODS (Bedingham et al.). By way of further example, the sample processing device 150 can include various features and elements, such as those described in U.S. Patent Publication No. 2007/0009391 titled COMPLIANT MICROFLUIDIC SAMPLE PROCESSING DISKS (Bedingham et al.).

As a result, by way of example only, the sample processing device 150 can include one or more input wells and/or other chambers (sometimes referred to as "non-thermal" chambers or "non-thermal" process chambers) 154 positioned in fluid communication with the thermal process chambers 152. For example, in some embodiments, a sample can be loaded onto the sample processing device 150 via the input wells 154 and can then be moved via channels (e.g., microfluidic channels) and/or valves to other chambers and/or ultimately to the thermal process chambers 152.

In some embodiments, as shown in FIGS. 1-2, the input wells 154 can be positioned between a center 151 of the sample processing device 150 and at least one of the thermal process chambers 152. In addition, the annular cover 160 can be configured to allow access to a portion of the sample processing device 150 that includes the input well(s) 154, such that the input well(s) 154 can be accessed when the cover 160 is positioned adjacent to or coupled to the sample processing device 150.

As shown in FIGS. 1-2, the annular cover 160 can, together with the base plate 110, compress a sample processing device 150 located therebetween, for example, to enhance thermal coupling between the thermal structure 130 on the base plate 110 and the sample processing device 150. In addition, the annular cover 160 can function to hold and/or maintain the sample processing device 150 on the base plate 110, such that the sample processing device 150 and/or the cover 160 can rotate with the base plate 110 as it is rotated about axis 111 by drive system 120. The rotation axis 111 can define a z-axis of the assembly 50.

As used herein, the term "annular" or derivations thereof can refer to a structure having an outer edge and an inner edge, such that the inner edge defines an opening. For example, an annular cover can have a circular or round shape (e.g., a circular ring) or any other suitable shape, including, but not limited to, triangular, rectangular, square, trapezoidal, polygonal, etc., or combinations thereof. Furthermore, an "annulus" of the present invention need not necessarily be symmetrical, but rather can be an asymmetrical or irregular shape; however, certain advantages may be possible with symmetrical and/or circular shapes.

The compressive forces developed between the base plate 110 and the cover 160 may be accomplished using a variety of different structures or combination of structures. One exemplary compression structure depicted in FIGS. 1-2 are magnetic elements 170 located on (or at least operatively coupled to) the cover 160 and corresponding magnetic elements 172 located on (or at least operatively coupled to) the base plate 110. Magnetic attraction between the magnetic elements 170 and 172 may be used to draw the cover 160 and the base plate 110 towards each other, thereby compressing, holding, and/or deforming a sample processing device 150 located therebetween. As a result, the magnetic elements 170 and 172 can be configured to attract each other to force the annular cover 160 in a first direction $D_1$ (see FIG. 1) along the z-axis of the assembly 50, such that at least a portion of the sample processing device 150 is urged into contact with the transfer surface 132 of the base plate 110.

As used herein, a "magnetic element" is a structure or article that exhibits or is influenced by magnetic fields. In some embodiments, the magnetic fields can be of sufficient strength to develop the desired compressive force that results in thermal coupling between a sample processing device 150 and the thermal structure 130 of the base plate 110 as discussed herein. The magnetic elements can include magnetic materials, i.e., materials that either exhibit a permanent magnetic field, materials that are capable of exhibiting a temporary magnetic field, and/or materials that are influenced by permanent or temporary magnetic fields.

Some examples of potentially suitable magnetic materials include, e.g., magnetic ferrite or "ferrite" which is a substance including mixed oxides of iron and one or more other metals, e.g., nanocrystalline cobalt ferrite. However, other ferrite materials may be used. Other magnetic materials which may be used in the assembly 50 may include, but are not limited to, ceramic and flexible magnetic materials made from strontium ferrous oxide which may be combined with a polymeric substance (such as, e.g., plastic, rubber, etc.); NdFeB (this magnetic material may also include Dysprosium); neodymium boride; SmCo (samarium cobalt); and combinations of aluminum, nickel, cobalt, copper, iron, titanium, etc.; as well as other materials. Magnetic materials may also include, for example, stainless steel, paramagnetic materials, or other magnetizable materials that may be rendered sufficiently magnetic by subjecting the magnetizable material to a sufficient electric and/or magnetic field.

In some embodiments, the magnetic elements 170 and/or the magnetic elements 172 can include strongly ferromagnetic material to reduce magnetization loss with time, such that the magnetic elements 170 and 172 can be coupled with a reliable magnetic force, without substantial loss of that force over time.

Furthermore, in some embodiments, the magnetic elements of the present disclosure may include electromagnets, in which the magnetic fields can be switched on and off between a first magnetic state and a second non-magnetic state to activate magnetic fields in various areas of the assembly 50 in desired configurations when desired.

In some embodiments, the magnetic elements 170 and 172 can be discrete articles operatively coupled to the cover 160 and the base plate 110, as shown in FIGS. 1-2 (in which the magnetic elements 170 and 172 are individual cylindrically-shaped articles). However, in some embodiments, the base plate 110, the thermal structure 130, and/or the cover 160 can include sufficient magnetic material (e.g., molded or otherwise provided in the structure of the component), such that separate discrete magnetic elements are not required. In some embodiments, a combination of discrete magnetic elements and sufficient magnetic material (e.g., molded or otherwise) can be employed.

As shown in FIGS. 1-2, the annular cover 160 can include a center 161, which can be in line with the rotation axis 111 when the cover 160 is coupled to the base plate 110, an inner edge 163 that at least partially defines an opening 166, and an outer edge 165. As described above, the opening 166 can facilitate accessing at least a portion of the sample processing device 150 (e.g., a portion comprising the input wells 154), for example, even when the annular cover 160 is positioned adjacent to or coupled to the sample processing device 150. As shown in FIGS. 1-2, the inner edge 163 of the annular cover 160 can be configured to be positioned inwardly (e.g., radially inwardly) of the thermal process chambers 152, relative to the center 161 of the annular cover 160, for example, when the annular cover 160 is positioned adjacent the sample processing device 150. In addition, the inner edge 163 of the annular cover 160 can be configured to be positioned radially outwardly of the input wells 154. Furthermore, in some embodiments, as shown in FIGS. 1-2, the outer edge 165 of the annular cover 160 can be configured to be positioned outwardly (e.g., radially outwardly) of the thermal process chambers 152 (and also outwardly of the input wells 154).

The inner edge 163 can be positioned a first distance $d_1$ (e.g., a first radial distance or "first radius") from the center 161 of the annular cover 160. In such embodiments, if the annular cover 160 has a substantially circular ring shape, the opening 166 can have a diameter equal to twice the first distance $d_1$. In addition, the outer edge 165 can be positioned a second distance $d_2$ (e.g., a second radial distance or "second radius") from the center 161 of the annular cover 160. In some embodiments, the first distance $d_1$ can be at least about 50% of the second distance. In some embodiments, at least about 60%, and in some embodiments, at least about 70%. In addition, in some embodiments, the first distance $d_1$ can be no greater than about 95% of the second distance, in some embodiments, no greater than about 85%, and in some embodiments, no greater than about 80%. In some embodiments, the first distance $d_1$ can be about 75% of the second distance $d_2$.

Furthermore, in some embodiments, the outer edge 165 can be positioned a distance $d_2$ (e.g., a radial distance) from the center 161, which can define a first area, and in some embodiments, the area of the opening 166 can be at least about 30% of the first area, in some embodiments, at least about 40%, and in some embodiments, at least about 50%. In some embodiments, the opening 166 can be no greater than about 95% of the first area, in some embodiments, no greater than about 75%, and in some embodiments, no greater than about 60%. In some embodiments, the opening 166 can be about 53% of the first area.

In addition, the annular cover 160 can include an inner wall 162 (e.g., an "inner circumferential wall" or "inner radial wall"; which can function as an inner compression ring, in some embodiments, as described below) and an outer wall 164 (e.g., an "outer circumferential wall" or "outer radial wall"; which can function as an outer compression ring, in some embodiments, as described below). In some embodiments, inner and outer walls 162 and 164 can include or define the inner and outer edges 163 and 165, respectively, such that the inner wall 162 can be positioned inwardly (e.g., radially inwardly) of the thermal process chambers 152, and the outer wall 164 can be positioned outwardly (e.g., radially outwardly) of the thermal process chambers 152. As further shown in FIGS. 1-2, in some embodiments, the inner wall 162 can include the magnetic elements 170, such that the magnetic elements 170 form a portion of or are coupled to the inner wall 162. For example, in some embodiments, the magnetic elements 170 can be embedded (e.g., molded) in the inner wall 162. As shown in FIG. 1-2, the annular cover 160 can further include an upper wall 167 that can be positioned to cover a portion of the sample processing device 150, such as a portion that comprises the thermal process chambers 152.

As shown in FIGS. 1 and 2, in some embodiments, the upper wall 167 can extend inwardly (e.g., radially inwardly) of the inner wall 162 and the magnetic elements 170. In the embodiment illustrated in FIGS. 1-4, the upper wall 167 does not extend much inwardly of the inner wall 162. However, in some embodiments, the upper wall 167 can extend further inwardly of the inner wall 162 and/or the magnetic elements 170 (e.g., toward the center 161 of the cover 160), for example, such that the size of the opening 166 is smaller than what is depicted in FIGS. 1-4. Furthermore, in some embodiments, the upper wall 167 can define the inner edge 163 and/or the outer edge 165.

In some embodiments, at least a portion of the cover 160, such as one or more of the inner wall 162, the outer wall 164, and the upper wall 167, can be optically clear. For example, at least a portion of the upper wall 167 that is adapted to be positioned over one or more of the input wells 154 and/or a portion of the upper wall 167 that is adapted to be positioned over the thermal process chambers 152 can be optically clear to allow for optically accessing at least a portion of the sample processing device 150.

As used herein, the phrase "optically clear" can refer to an object that is transparent to electromagnetic radiation ranging from the infrared to the ultraviolet spectrum (e.g., from about 10 nm to about 10 μm (10,000 nm)); however, in some embodiments, the phrase "optically clear" can refer to an object that is transparent to electromagnetic radiation in the visible spectrum (e.g., about 400 nm to about 700 nm). In some embodiments, the phrase "optically clear" can refer to an object with a transmittance of at least about 80% within the wavelength ranges above.

Such configurations of the annular cover 160 can function to effectively or substantially isolate the thermal process chambers 152 of the sample processing device 150 when the cover 160 is coupled to or positioned adjacent the sample processing device 150. For example, the cover 160 can physically, optically, and/or thermally isolate a portion of the sample processing device 150, such as a portion comprising the thermal process chambers 152. In some embodiments, as shown in FIG. 1, the sample processing device 150 can include one or more thermal process chambers 152, and further, in some embodiments, the one or more thermal process chambers 152 can be arranged in an annulus about the center 151 of the sample processing device 150, which can sometimes be referred to as an "annular processing ring." In such embodiments, the annular cover 160 can be adapted to cover and/or isolate a portion of the sample processing device 150 that includes the annular processing ring or the thermal process chambers 152. For example, the annular cover 160 includes the inner wall 162, the outer wall 164, and the upper wall 167 to cover and/or isolate the portion of the sample processing device 150 that includes the thermal process chambers 152. In some embodiments, one or more of the inner wall 162, the outer wall 164, and the upper wall 167 can be a continuous wall, as shown, or can be formed of a plurality of portions that together function as an inner or outer wall (or inner or outer compression ring), or an upper wall. In some embodiments, enhanced physical and/or thermal isolation can be obtained when at least one of the inner wall 162, the outer wall 164 and the upper wall 167 is a continuous wall.

In addition, in some embodiments, the ability of the annular cover 160 to cover and effectively thermally isolate the thermal process chambers 152 from ambience and/or from other portions of the assembly 50 can be important, because otherwise, as the base plate 110 and the sample processing device 150 are rotated about the rotation axis 111, air can be caused to move quickly past the thermal process chambers 152, which, for example, can undesirably cool the thermal process chambers 152 when it is desired for the chambers 152 to be heated. Thus, in some embodiments, depending on the configuration of the sample processing device 150, one or more of the inner wall 162, the upper wall 167 and the outer wall 164 can be important for thermal isolation.

As shown in FIGS. 1-2, in some embodiments, the sample processing device 150 can also include a device housing or body 153, and in some embodiments, the body 153 can define the input wells 154 or other chambers, any channels, the thermal process chambers 152, etc. In addition, in some embodiments, the body 153 of the sample processing device 150 can include an outer lip, flange or wall 155. In some embodiments, as shown in FIGS. 1-2, the outer wall 155 can include a portion 157 adapted to cooperate with the base plate 110 and a portion 159 adapted to cooperate with the annular cover 160. For example, as shown in FIG. 2, the annular cover 160 (e.g., the outer wall 164) can be dimensioned to be received within the area circumscribed by the outer wall 155 of the sample processing device 150. As a result, in some embodiments, the outer wall 155 of the sample processing device 150 can cooperate with the annular cover 160 to cover and/or isolate the thermal process chambers 152. Such cooperation can also facilitate positioning of the annular cover 160 with respect to the sample processing device 150 such that the thermal process chambers 152 are protected and covered without the annular cover 160 pressing down on or contacting any of the thermal process chambers 152.

In some embodiments, the outer wall 155 of the sample processing device 150 and the one or more input wells 154 formed in the body 153 of the sample processing device 150 can effectively define a recess (e.g., an annular recess) 156 in the sample processing device 150 (e.g., in a top surface of the sample processing device 150) in which at least a portion of the annular cover 160 can be positioned. For example, as shown in FIGS. 1-2, the inner wall 162 (e.g., including the magnetic elements 170) and the outer wall 164 can be positioned in the recess 156 of the sample processing device 150 when the annular cover 160 is positioned over or coupled to the sample processing device 150. As a result, in some embodiments, the outer wall 155, the input wells 154 and/or the recess 156 can provide reliable positioning of the cover 160 with respect to the sample processing device 150.

Figure 5:
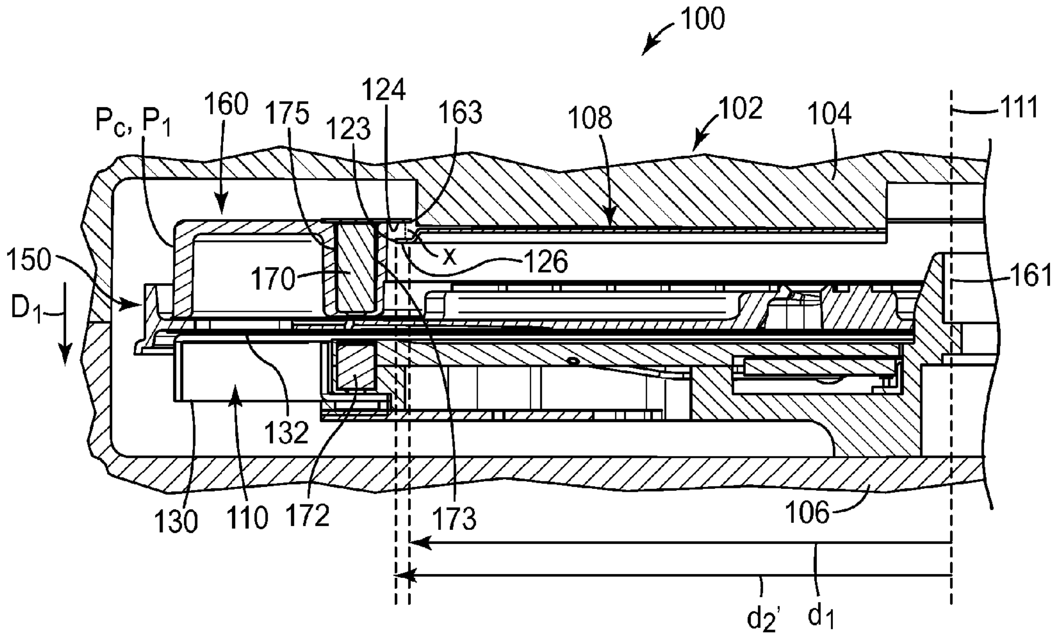
FIG. 5 is a close-up side cross-sectional view of the system of FIGS. 3-4, the system shown in a first position.
Figure 6:
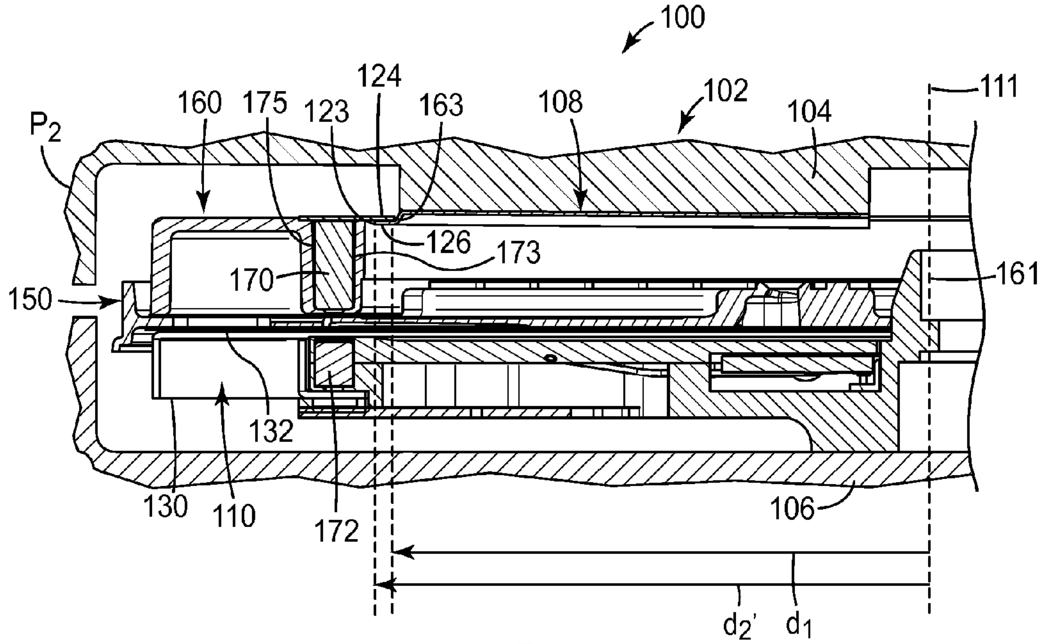
FIG. 6 is a close-up side cross-sectional view of the system of FIGS. 3-5, the system shown in a second position.
Figure 7:
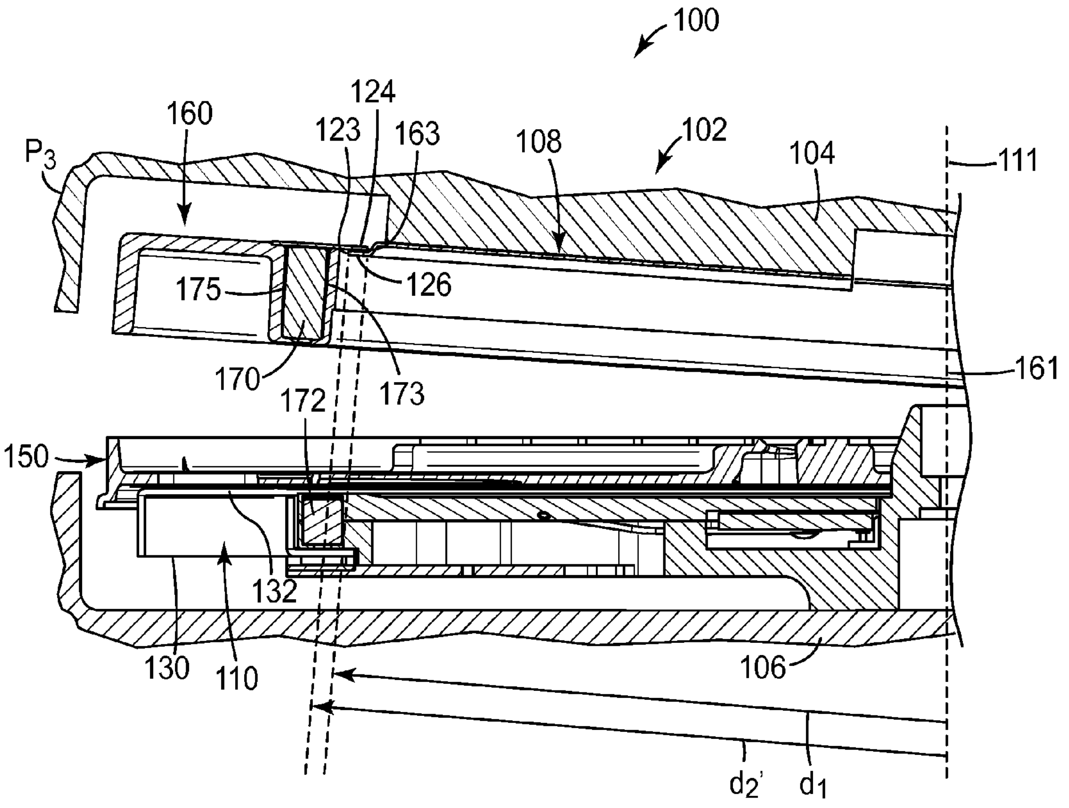
FIG. 7 is a close-up side cross-sectional view of the system of FIGS. 3-6, the system shown in a third position.

In some embodiments, as shown in FIGS. 1-2, the magnetic elements 170 can be arranged in an annulus, and the annulus or portion of the cover 160 that includes the magnetic elements 170 can include an inner edge (e.g., an inner radial edge) 173 (see FIGS. 5-7) and an outer edge (e.g., an outer radial edge) 175 (see FIGS. 5-7). As shown in FIGS. 1-2, the cover 160 and/or the magnetic elements 170 can be configured, such that both the inner edge 173 and the outer edge 175 can be positioned inwardly (e.g., radially inwardly) with respect to the thermal process chambers 152.

As a result, in some embodiments, the magnetic elements 170 can be restricted to an area of the cover 160 where the magnetic elements 170 are positioned outwardly (e.g., radially outwardly) of the input wells 154 (or other protrusions, chambers, recesses, or formations in the body 153) and inwardly (e.g., radially inwardly) of the thermal process chambers 152. In such configurations, the magnetic elements 170 can be said to be configured to maximize the open area of the sample processing device 150 that is available for access by other devices or for other functions. In addition, in such embodiments, the magnetic elements 170 can be positioned so as not to interrupt or disturb the processing of a sample positioned in the thermal process chambers 152.

In some embodiments, as shown in FIGS. 1-2, the magnetic elements 170 of the cover 160 can form at least a portion of or be coupled to the inner wall 162, such that the magnetic elements 170 can function as at least a portion of the inner compression ring 162 to compress, hold, and/or deform the sample processing device 150 against the thermal transfer surface 132 of the thermal structure 130 of the base plate 110. As shown in FIGS. 1-2, one or both of the magnetic elements 170 and 172 can be arranged in an annulus, for example, about the rotation axis 111. Furthermore, in some embodiments, at least one of the magnetic elements 170 and 172 can include a substantially uniform distribution of magnetic force about such an annulus.

In addition, the arrangement of the magnetic elements 170 in the cover 160 and the corresponding arrangement of the magnetic elements 172 in the base plate 110 can provide additional positioning assistance for the cover 160 with respect to one or both of the sample processing device 150 and the base plate 110. For example, in some embodiments, the magnetic elements 170 and 172 can each include sections of alternating polarity and/or a specific configuration or arrangement of magnetic elements, such that the magnetic elements 170 of the cover 160 and the magnetic elements 172 of the base plate 110 can be "keyed" with respect to each other to allow the cover 160 to reliably be positioned in a desired orientation (e.g., angular position relative to the rotation axis 111) with respect to at least one of the sample processing device 150 and the base plate 110.

In some embodiments, compliance of sample processing devices of the present disclosure may be enhanced if the devices include annular processing rings that are formed as composite structures including cores and covers attached thereto using pressure sensitive adhesives. The sample processing device 150 shown in FIGS. 1-2 is an example of one such composite structure. As shown in FIG. 1, in some embodiments, the sample processing device 150 can include the body 153 to a first covers 182 and a second cover (not shown) are attached using adhesives (e.g., pressure sensitive adhesives). Where process chambers (e.g., thermal process chambers 152) are provided in a circular array (as depicted in FIG. 1) that is formed by a composite structure, the thermal process chambers 152 and covers can at least partially define a compliant annular processing ring that is adapted to conform to the shape of the underlying thermal transfer surface 132 when the sample processing device 150 is forced against the transfer surface 132, such as a shaped thermal transfer surface 132. In such embodiments, the compliance can be achieved with some deformation of the annular processing ring while maintaining the fluidic integrity of the thermal process chambers or any other fluidic passages or chambers in the sample processing device 150 (i.e., without causing leaks).

In some embodiments, the annular cover 160 may not include an outer wall 164 and/or an upper wall 167. In such embodiments, the thermal process chambers 152 may be exposed and accessible, or the upper wall 167 alone, if present, may cover that portion of the sample processing device 150. Furthermore, in some embodiments, the cover may include a smaller opening than the opening 166 shown in FIGS. 1-2, and in some embodiments, the cover may not include an opening at all, but rather can be disc-shaped.

That is, in some embodiments, the assembly 50 and system 100 can be used in connection with a different sample processing device and/or cover than those of the sample processing assembly 50. It should be understood that that the sample processing assembly 50 is shown by way of example only. Other sample processing devices may themselves be capable of substantially thermally isolating thermal process chambers without requiring that the cover be configured to provide thermal isolation. As a result, the systems of the present disclosure can be adapted to cooperate with a variety of covers and sample processing devices. In addition, certain covers may be more useful in combination with some sample processing devices than others.

The system 100 shown in FIGS. 3-7 is shown as including the sample processing assembly 50; however, it should be noted that other sample processing assemblies can be used in connection with, or form a portion of, the system 100. In addition, as mentioned above, in some embodiments, the sample processing device is a consumable component and does not form a portion of the sample processing assembly 50 or the system 100.

Figure 3:
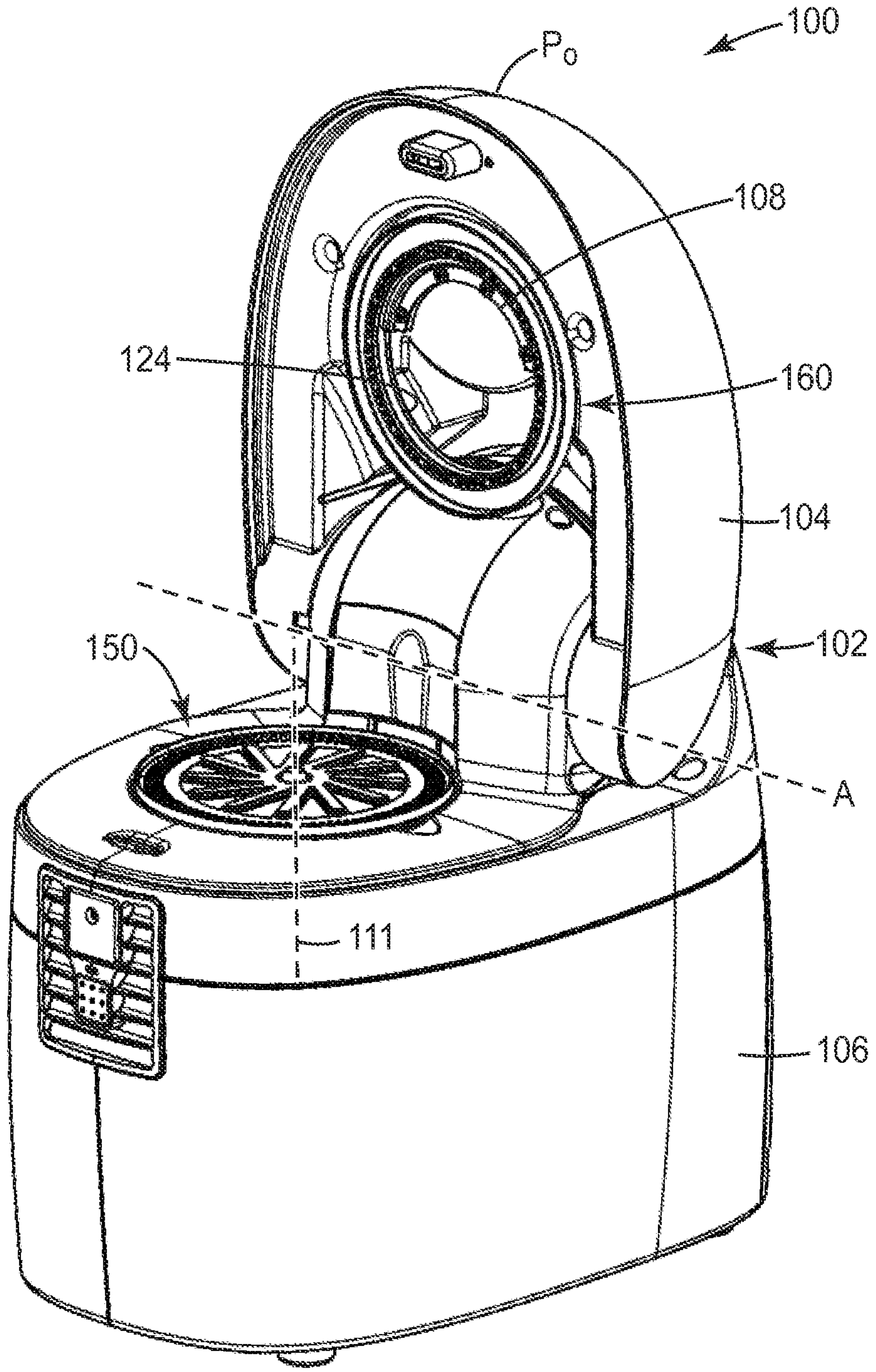
FIG. 3 is a perspective view of a system according to one embodiment of the present disclosure, the system including the assembly of FIGS. 1-2, the system shown in an open position.
Figure 4:
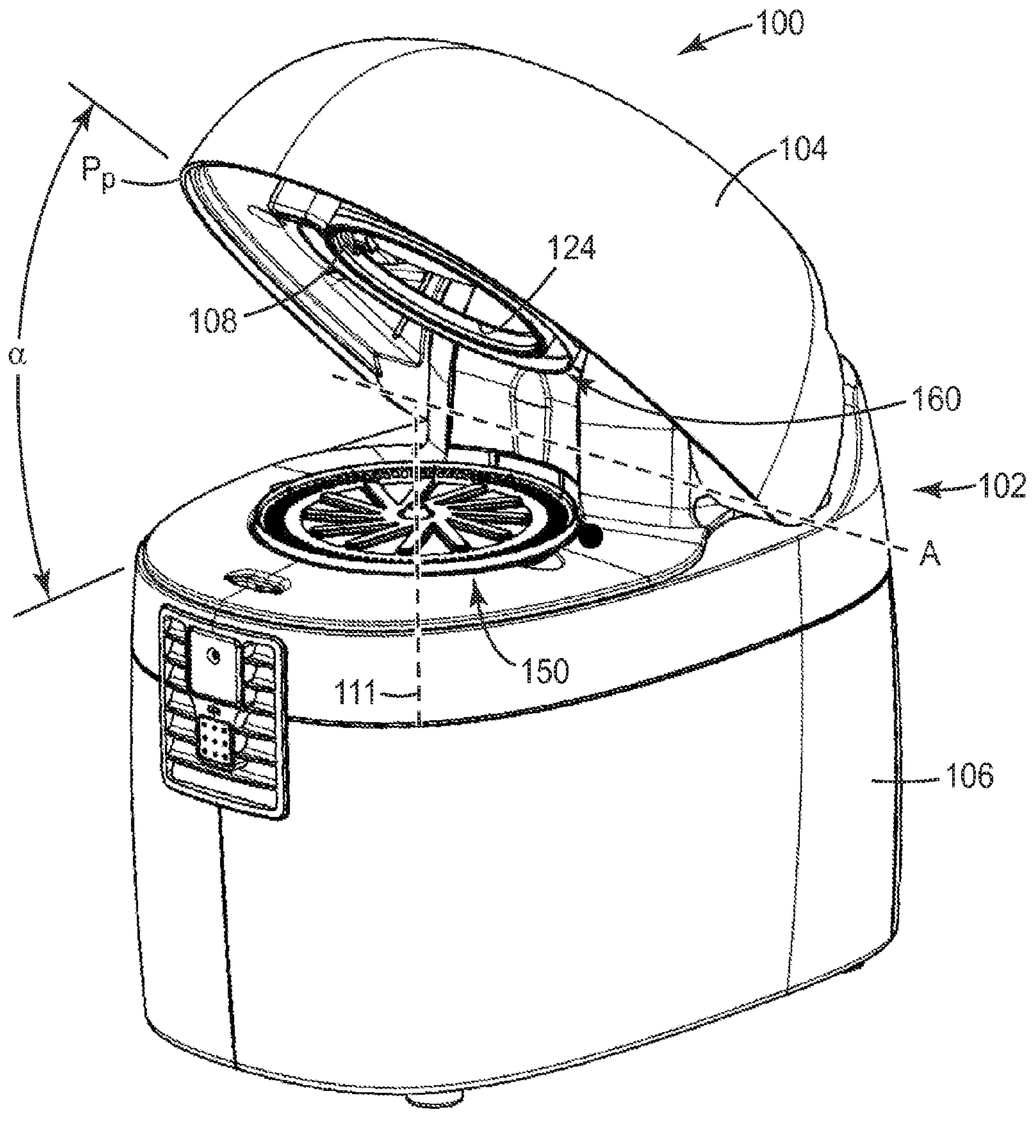
FIG. 4 is a perspective view of the system of FIG. 3, the system shown in a partially open position.

The system 100 is shown in an open position or state $P_o$ in FIG. 3 and in a partially closed (or partially open) state or position $P_p$ in FIG. 4. As shown in FIGS. 3 and 4, the system 100 can include a housing 102 that can include a first portion (sometimes referred to as a "lid") 104 and a second portion (sometimes referred to as a "base") 106 that are movable with respect to each other between the open position $P_o$ and a closed position $P_c$ (see FIG. 5), including a variety of positions intermediate of the open position $P_o$ and the closed position $P_c$, such as the partially closed position $P_p$. By way of example only, the first portion 104 is shown in FIGS. 3 and 4 as being movable with respect to the second portion 106, while the second portion 106 remains substantially stationary. However, it should be understood that a variety of suitable relative movements between the first portion 104 and the second portion 106 can be employed. For example, in some embodiments, the second portion 106 can be movable relative to the first portion 104.

The housing 102, and particularly, the first portion 104 and the second portion 106, can form an enclosure around the sample processing assembly 50, for example, during various processing or assaying steps or procedures, such as those described above, so as to isolate the sample processing assembly 50 from ambience during such processing. That is, in some embodiments, the housing 102 can be configured to have at least one state or position in which the at least a portion of the sample processing assembly 50 can be thermally isolated from ambience, physically separated or protected from ambience, and/or fluidly separated from ambience.

As described above, the cover 160 can be used to hold, maintain and/or deform the sample processing device 150 on the base plate 110. The base plate 110 is not visible in FIGS. 3 and 4 because the sample processing device 150 has already been positioned on the base plate 110 in FIGS. 3 and 4. The cover 160 is shown in FIGS. 3 and 4 as being coupled to a portion of the first portion 104 of the housing 102. For example, in FIG. 3, the cover 160 has been positioned on a hanger 108 that is provided by the first portion 104 of the housing 102. The housing 102 can include or can be coupled to the hanger 108. In addition, by way of example only, the system 100 is shown in FIGS. 3 and 4 as the cover 160 being coupled to the first portion 104 of the housing 102, and the sample processing device 150 being positioned on the base plate 110 in the second portion 106 of the housing 102. However, it should be understood that a variety of other suitable configurations are possible and within the scope of the present disclosure. For example, in some embodiments, the second portion 106 is movable with respect to the first portion 104, and in some embodiments, the sample processing device 150 and the base plate 110 are positioned in the first portion 104 of the housing 102, and the cover 160 is coupled to a hanger 108 in the second portion 106 of the housing 102.

In addition, although not shown in FIGS. 3 and 4, the base plate 110 can be rotated about the rotation axis 111 via any of a variety of drive systems that can be positioned in the system 100, or coupled to the system 100. For example, in some embodiments, a suitable drive system can be located in the second portion 106 of the housing 102, positioned to drive the base plate 110. Furthermore, in some embodiments, the electromagnetic energy source 190 can also be positioned below the base plate 110 in the second portion 106 of the housing 102.

As shown in FIGS. 3 and 4, the cover 160 can interact with at least a portion of the housing 102 (e.g., the hanger 108 provided by the first portion 104 of the housing 102), such that the cover 160 can be moved toward or away from the sample processing device 150 when the first portion 104 and the second portion 106 of the housing 102 are moved relative to one another. In addition, in some embodiments, the cover 160 can be coupled to or decoupled from a portion of the housing 102 without the use of additional tools or equipment. Such an interaction between the cover 160 and the housing 102 can provide robust, reliable and safe positioning of the cover 160 with respect to the sample processing device 150 and/or the base plate 110. Furthermore, the cover 160 can be decoupled from the first portion 104 of the housing 102 for cleaning and/or disposal. Then, the cover 160 can be reused, for example, with a new sample processing device 150, by repositioning the cover 160 on the hanger 108. Alternatively, the cover 160 can be discarded after use, and a new, second cover can then be coupled to the housing 102 and moved toward the sample processing device 150 (or a new sample processing device) and/or the base plate 110.

As described above, the magnetic elements 170 in the cover 160 can be adapted to attract the magnetic elements 172 in the base plate 110. As a result, as the first portion 104 of the housing 102 is moved closer to the second portion 106, the magnetic elements 170 begin to get near enough to the magnetic elements 172 to cause an attraction between the magnetic elements 170 and the magnetic elements 172. Such an attraction can provide additional positioning assistance between the cover 160 and the base plate 110 and/or the sample processing device 150. For example, such an attraction can inhibit the cover 160 from falling off of the hanger 108 as the angle α (as shown in FIG. 4 and described below) between the first portion 104 and the second portion 106 decreases.

As shown in FIGS. 1-2, the inner edge 163 of the cover 160 is at least partially provided by a lip, flange or projection 124 (see also FIGS. 3-7; also sometimes referred to as the "first projection"). By way of example only, the projection 124 is shown as being an extension of the upper wall 167 of the cover 160, and extending further inwardly (e.g., radially inwardly) of the inner edge 173 of the magnetic elements 170 (and/or of the inner wall 162). Because the cover 160 is shown in the illustrated embodiment as having a circular ring shape, the projection 124 of the illustrated embodiment is an inner radial projection that projects radially inwardly, relative to the center 161 of the cover 160. However, it should be understood that other configurations of the projection 124 are possible, and can depend on the general shape and structure of the cover 160. For example, in some embodiments, the projection 124 is not necessarily a radial projection, and in some embodiments, the projection 124 is not necessarily an inner projection, as will be described in greater detail below.

As further shown in FIGS. 5-7, the hanger 108 can include a lip, flange or projection 126 (see FIGS. 5-7; also sometimes referred to as the "second projection") that can be adapted to engage or to be coupled to the first projection 124 of the cover 160. By way of example only, the hanger 108 is shown as including an arc and having a substantially arcuate (e.g., almost semi-circular) shape, and the second projection 126 is shown as including an arc and having a substantially arcuate (e.g., almost semi-circular) shape. In addition, the second projection 126 is shown as being an outer projection and as extending radially outwardly, for example, relative to the center 161 of the cover 160 when the cover 160 is coupled to the hanger 108.

The arcuate shape of the hanger 108 of the illustrated embodiment can facilitate coupling the cover 160 to the hanger 108, can facilitate coupling/decoupling the cover 160 to/from the hanger 108 without the need for additional tools or equipment, and can facilitate holding the cover 160 throughout the relative movement between the first portion 104 and the second portion 106 (e.g., from an open position $P_o$ to a closed position $P_c$).

As a result, in some embodiments, the hanger 108 can include at least a 90-degree arc, in some embodiments, at least a 120-degree arc, and in some embodiments, at least a 140-degree arc. Furthermore, in some embodiments, the hanger 108 can include an arc of no greater than 180 degrees, in some embodiments, an arc of no greater than 170 degrees, and in some embodiments, an arc of no greater than 160 degrees. In embodiments in which the hanger 108 has a lower-angled arc, coupling/decoupling the cover 160 to/from the hanger 108 can be facilitated. However, in embodiments in which the hanger 108 has a higher-angled arc, the cover 160 can be better inhibited from undesirably falling off of the hanger 108.

In addition, with reference to FIGS. 5-7, in some embodiments, the distance between the cover 160 and the first portion 104 of the housing 102 when the cover 160 is coupled to the hanger 108 can at least partially play a role in facilitating coupling/decoupling the cover 160 to/from the hanger 108 and/or in inhibiting the cover 160 from undesirably falling off of the hanger 108. For example, in some embodiments, a pocket formed in the first portion 104 can be adapted to receive at least a portion of the cover 160 when the cover 160 is coupled to the hanger 108, and, in some embodiments, the clearance between the cover 160 and the pocket can facilitate coupling/decoupling the cover 160 to/from the hanger 108 and/or can inhibit the cover 160 from undesirably falling off of the hanger 108.

That is, when the first portion 104 of the housing 102 is at least partially open (i.e., moved at least partially away from the second portion 106), the cover 160 can be hung on the hanger 108 by coupling the first projection 124 to the second projection 126. As shown in FIG. 3, positioning the first portion 104 of the housing 102 in the open position $P_o$ shown in FIG. 3, can facilitate hanging the cover 160 on the hanger 108 by engaging the first projection 124 and the second projection 126. Furthermore, the cover 160 can be coupled to the hanger 108 (and the first projection 124 can be coupled to the second projection 126) without the need for additional tools or equipment.

Then, as shown in FIG. 4, the first portion 104 and the second portion 106 of the housing 102 can be moved toward one another to close the housing 102 and to assemble the sample processing assembly 50, such that the cover 160 comes down into contact with one or more of the sample processing device 150 and the base plate 110 and urges at least a portion of the sample processing device 150 into contact with at least a portion of the base plate 110 (e.g., the thermal structure 130 of the base plate 110). For example, such compression and urging can be accomplished by attraction of the magnetic elements 170 and 172.

As shown by way of example only in FIGS. 3 and 4, in some embodiments, the housing 102 can be configured so that the first portion 104 and the second portion 106 are pivotally movable with respect to one another. For example, as shown in FIGS. 3 and 4, the first portion 104 can be pivoted (e.g., rotated about a pivot axis A) between an open position $P_o$ and a closed position $P_c$ (see FIG. 5) to close the housing 102 and to move the cover 160 toward the sample processing device 150 and/or the base plate 110. In such embodiments, particular advantages can be achieved by allowing a certain amount of overlap between the first and second projections 124 and 126, to inhibit the cover 160 from falling off of the hanger 108 when the first portion 104 is in a partially closed position $P_p$, as shown in FIG. 4. That is, as shown in FIG. 4, the first and second projections 124 and 126 can be configured such that the cover 160 can remain coupled to the hanger 108 (i.e., and the first projection 124 and the second projection 126 can remain coupled) throughout movement of the first portion 104 between an open position, such as position $P_o$, and a closed position. Said another way, in some embodiments, the second projection 126 can be used to hold the cover 160 by the first projection 124. For example, when the first portion 104 and the second portion 106 are pivotally movable with respect to one another, the cover 160 can remain coupled to the hanger 108 (i.e., and the first projection 124 and the second projection 126 can remain coupled) no matter what the angle α is between the first portion 104 and the second portion 106.

Employing pivotal movement between the first portion 104 and the second portion 106 of the housing 102 (and, in the illustrated embodiment, between the first portion 104 and the base plate 110) is shown and described by way of example only; however, it should be understood that a variety of types of movement can be employed in the housing 102 without departing from the scope of the present disclosure. For example, in some embodiments, the first portion 104 and the second portion 106 of the housing 102 can be slidably movable with respect to one another. By way of further example, in some embodiments, the first portion 104 and the second portion 106 of the housing 102 (or the first portion 104 and the base plate 110) can be movable with respect to one another via a gantry system. For example, in some embodiments, the first portion 104 can move via a gantry system above the second portion 106 (and the base plate 110).

One of skill in the art will understand that the first and second projections 124 and 126 can be configured in a variety of manners to achieve coupling of the cover 160 to the hanger 108 throughout movement of the first portion 104 and/or the second portion 106 between an open and closed position. For example, in some embodiments, the first projection 124 and the second projection 126 can be configured to overlap by at least about 1 mm, in some embodiments, at least about 2 mm, and in some embodiments, at least 3 mm. In some embodiments, the first projection 124 and the second projection 126 can be configured to overlap by no greater than the first distance $d_1$. In addition, in some embodiments, one or more of the projections 124 and 126 can be angled or oriented toward the other to further encourage coupling of the first and second projections 124 and 126, for example, at a variety of angles α between an open and closed position. Furthermore, in some embodiments, one or more of the projections 124 and 126 can include a mating or engaging feature to further encourage or facilitate coupling of the first and second projections 124 and 126, for example, at a variety of angles α between an open and closed position.

In some embodiments, the first projection 124 can extend a first distance (e.g., a first radial distance) in a first direction (e.g., a first radial direction, such as toward the center 161 of the cover 160) in a plane orthogonal to the rotation axis 111 or the z-axis of the system 100. In addition, in some embodiments, the second projection 126 can extend a second distance (e.g., a second radial distance) in a second direction substantially parallel and opposite to the first direction (e.g., away from the center 161 of the cover 160), such that the first projection 124 and the second projection 126 overlap, for example, when the cover 160 is coupled to the hanger 108.

Furthermore, in some embodiments, the first projection 124 can include the inner edge 163 (which can be referred to as a "first edge"; see FIGS. 1-2 and 5-7), which is positioned a first distance $d_1$ from the center 161 of the cover 160 (or the rotation axis 111). In addition, in some embodiments, the second projection 126 can include an outer edge 123 (which can be referred to as a "second edge"; see FIGS. 5-7) positioned a second distance $d_2'$ from the center 161 of the cover 160 when the cover 160 is coupled to the hanger 108. Furthermore, in some embodiments, the second distance $d_2'$ can be greater than the first distance $d_1$, such that the first projection 124 and the second projection 126 overlap.

As shown in FIGS. 5-7, in some embodiments, the overlap between the first projection 124 and the second projection 126 can increase as the first portion 104 and the second portion 106 are moved apart from one another (e.g., as the first portion 104 is moved from the first position $P_1$ shown in FIG. 5 to the second position $P_2$ shown in FIG. 6 and the third position $P_3$ shown in FIG. 7). That is, the cover 160 can slide toward the hanger 108 further as the hanger 108 picks up the cover 160 (e.g., in embodiments employing pivotal movement between the first portion 104 and the second portion 106). As such, in some embodiments, the first distance $d_1$ can decrease as the first portion 104 and the second portion 106 are moved with respect to one another, such that the distance between (or difference between) the first distance $d_1$ and the second distance $d_2'$ can increase.

Moreover, in some embodiments, the cover 160 can be in the shape of a circular ring. In such embodiments, the first projection 124 can be a first radial projection 124 which can extend radially inwardly (e.g., toward the center 161 of the cover 160) and which can define a first or inner radius $d_1$ measured from the center 161 of the cover 160 (or the rotation axis 111 of the system 100). In addition, in such embodiments, the second projection 126 can be a second radial projection 126 which can extend radially outwardly (e.g., away from the center 161 of the cover 160) and which can define a second or outer radius $d_2'$ measured from the center 161 of the cover 160 (or the rotation axis 111). The second radius can be greater than the first radius, such that the first radial projection 124 and the second radial projection 126 overlap.

As described in greater detail below with reference to FIGS. 5-7, in some embodiments, the cover 160 and the hanger 108 (and accordingly, the first projection 124 and the second projection 126) can become decoupled at a desired position. For example, in some embodiments, the cover 160 and the hanger 108 can become decoupled when the housing 102 is closed, that is, when the first portion 104 and the second portion 106 are positioned adjacent one another in a closed position (see position $P_c$ in FIG. 5). Such decoupling can occur in order to allow the cover 160 to disengage from the hanger 108 and/or to engage with the other components of the sample processing assembly 50.

By way of example only, three different relative positions of the first portion 104 and the second portion 106 of the housing 102 are shown in FIGS. 5-7. A first position $P_1$, which is also the closed position $P_c$ referenced above, is shown in FIG. 5. As shown in FIG. 5, the housing 102 is closed, and the sample processing assembly 50 is closed. That is, as shown, the cover 160 is positioned atop the sample processing device 150, which is positioned atop the base plate 110, and the magnetic elements 170 of the cover 160 and the magnetic elements 172 of the base plate 110 are being attracted to each other, urging at least a portion of the sample processing device 150 in the first direction $D_1$ along the z-axis toward the base plate 110, and namely, toward the thermal transfer surface 132 of the thermal structure 130 of the base plate 110.

As further shown in FIG. 5, in the first position $P_1$, the second projection 126 is not coupled to the first projection 124, and the cover 160 is not coupled to the hanger 108. Rather, the first projection 124 and the second projection 126 are spaced a distance X apart (e.g., wherein X is a vertical distance along the z-axis or rotation axis 111 of the system 100 and parallel to the first direction $D_1$), such that the cover 160 can rotate with the base plate 110 about the rotation axis 111, without any interference from the second projection 126. That is, as the first portion 104 and the second portion 106 of the housing 102 are moved closer together, the cover 160, and particularly, the magnetic elements 170, are able to interact with the base plate 110 and/or the sample processing device 150. In addition, as the first portion 104 and the second portion 106 are moved closer together, the cover 160 may begin to disengage from the hanger 108 and may begin to engage the other components of the sample processing assembly 50. In some embodiments, this may all occur at one point in time, for example, at the moment when the housing 102 is closed, or when the first portion 104 is moved into its closed position $P_c$ relative to the second portion 106 of the housing 102.

FIG. 6 shows the first portion 104 and the second portion 106 of the housing 102 in a second position $P_2$ relative to one another. In the second position $P_2$, the first portion 104 and the second portion 106 have become to be separated or moved apart from one another. As shown in FIG. 6, such movement of the first portion 104 can begin to move the hanger 108 and the second projection 126 relative to the cover 160 and the first projection 124. As such, in the second position $P_2$, the second projection 126 has begun to engage or be coupled to the first projection 124. As shown in FIG. 6, the housing 102 is open (e.g., in a partially open (or partially closed) position), while the sample processing assembly 50 remains in a closed position, because the cover 160 is still coupled to the sample processing device 150 and/or the base plate 110 (e.g., at least partially via the magnetic attraction between the magnetic elements 170 and the magnetic elements 172).

FIG. 7 illustrates the first portion 104 and the second portion 106 of the housing 102 in a third position $P_3$ relative to one another. In the third position $P_3$, the first portion 104 and the second portion 106 have become separated even further than in the second position $P_2$ of FIG. 6. In addition, FIG. 6 shows that the additional movement of the first portion 104 to the third position $P_3$ caused the second projection 126 of the hanger 108 to pull upwardly on the first projection 124 of the cover 160, ultimately overcoming the attraction between the magnetic elements 170 and the magnetic elements 172, and allowing the cover 160 to lift off of the other components of the sample processing assembly 50 (i.e., the sample processing device 150 and/or the base plate 110). As a result, the housing 102 is open (e.g., in a partially open (or partially closed) position), and the sample processing assembly 50 is also open (e.g., in a partially open (or partially closed) position. The first portion 104 and the second portion 106 can then continue to be moved further apart from one another to, for example, the open position $P_o$ shown in FIG. 3. As described above, the first and second projections 124 and 126 can be configured to inhibit the cover 160 from falling off of the hanger 108 (and, accordingly, to inhibit the first projection 124 and the second projection 126 from becoming decoupled) during the movement from the closed position $P_c$ shown in FIG. 5 to the open position $P_o$ shown in FIG. 3.

As a result, the first portion 104 of the housing 102 can be moved toward and away from the base plate 110, which can move the cover 160 between a position in which the cover 160 is not coupled to the base plate 110 (e.g., via the magnetic elements 170 and 172) and a position in which the cover 160 is coupled to the base plate 110. By way of example only, the magnetic attraction between the magnetic elements 170 and the magnetic elements 172 is described as being configured to pull the cover 160 onto the base plate 110, for example, along the first direction $D_1$. However, it should be understood that a variety of suitable configurations of the magnetic elements 170 and 172, in addition to other compression structures, can also be employed in order to couple the cover 160 to the base plate 110. For example, in some embodiments, the cover 160 can be pushed along the first direction $D_1$ rather than being pulled. By way of example only, there could be an electromagnetic connection between at least a portion of the first portion 104 of the housing 102 (e.g., the hanger 108) and the magnetic elements 170 of the cover 160, and there could be no magnetic elements 172 in the base plate 110. In such embodiments, the electromagnetic connection between the cover 160 and the first portion 104 of the housing 102 could be reversed as the cover 160 approached the base plate 110 in order to push the cover 160 down onto the base plate 110.

Similarly, in some embodiments, the first and second projections 124 and 126 or other portions of the cover 160 and the hanger 108 can be adapted to be magnetically coupled together. For example, in some embodiments, electromagnets that can be switched on and off can be employed to assist in the coupling and decoupling between the hanger 108 and the cover 160. In addition, in some embodiments, there is no magnetic attraction between the hanger 108 and the cover 160 so as not to compete with the magnetic forces occurring between the cover 160 and the base plate 110.

In the embodiment illustrated in FIGS. 1-7 and described herein, the first projection 124 is shown as projecting or extending inwardly, and the second projection 126 is shown as projecting or extending outwardly, such that the first and second projections 124 and 126 overlap and can be engaged. However, it should be understood that in some embodiments, the first projection 124 can be an outer projection. For example, the first projection 124 can project outwardly away from the center 161 of the cover 160, e.g., in embodiments employing covers including continuous top surfaces and no opening 166. In such embodiments, the second projection 126 can be an inner projection adapted to engage the first outer projection 124. For example, the second projection 126 can project inwardly toward the center 161 of the cover 160 (e.g., when the cover 160 is coupled to the hanger 108).

As mentioned above, other covers, sample processing devices and base plates can be employed without departing from the scope of the present disclosure. In addition, a variety of combinations of various embodiments of the present disclosure can be employed. The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure.

One embodiment of the present disclosure includes a system for processing sample processing devices, the system comprising: a base plate operatively coupled to a drive system and having a first surface, wherein the drive system rotates the base plate about a rotation axis, and wherein the rotation axis defines a z-axis; a cover adapted to be positioned facing the first surface of the base plate, the cover including a first projection; a housing comprising a portion movable with respect to the base plate between an open position in which the cover is not coupled to the base plate and a closed position in which the cover is coupled to the base plate, the portion including a second projection, the first projection and the second projection adapted to be coupled together when the portion is in the open position and decoupled from each other when the portion is in the closed position, such that the cover is rotatable with the base plate about the rotation axis when the portion is in the closed position and when the cover is coupled to the base plate; and a sample processing device comprising at least one process chamber and adapted to be positioned between the base plate and the cover, the sample processing device rotatable with the base plate about the rotation axis when the sample processing device is coupled to the base plate.

In such a system embodiment, the first projection can include a first radial projection that extends in a radial direction.

In any of the embodiments above, the second projection can include a second radial projection that extends in a radial direction.

In any of the embodiments above, the portion of the housing can include a first portion that is movable with respect to a second portion of the housing, and the base plate can be positioned in the second portion of the housing.

In any of the embodiments above, the portion of the housing can be pivotally movable with respect to the base plate.

In any of the embodiments above, the portion of the housing can be slidably movable with respect to the base plate.

In any of the embodiments above, the portion of the housing can be movable with respect to the base plate via a gantry system.

In any of the embodiments above, the sample processing device can be adapted to be positioned between the base plate and the cover.

In any of the embodiments above, the first projection can extend a first distance in a first direction in a plane orthogonal to the z-axis, and the second projection can extend a second distance in a second direction substantially parallel and opposite to the first direction, such that the first projection and the second projection overlap.

In any of the embodiments above, the first projection can include a first edge positioned a first distance from a center of the cover, the second projection can include a second edge positioned a second distance from the center of the cover, and the second distance can be greater than the first distance.

In any of the embodiments above, the cover can be in the shape of a circular annulus, wherein the first projection of the cover includes a first radial projection that extends radially inwardly and defines an inner radius measured from a center of the cover, and wherein the second projection includes a second radial projection that extends radially outwardly and defines an outer radius measured from the center of the cover, and wherein the outer radius is greater than the inner radius.

In any of the embodiments above, the second projection can be spaced a distance from the first projection when the portion of the housing is in the closed position, such that the cover is rotatable with the base plate.

In any of the embodiments above, the second projection can be movable into contact with the first projection when the portion of the housing is moved from the closed position to the open position.

In any of the embodiments above, the second projection can be adapted to pick up the cover by engaging the first projection when the portion of the housing is moved from the closed position to the open position.

In any of the embodiments above, the second projection can be adapted to hold the cover when the portion of the housing is in the open position.

In any of the embodiments above, the cover can be adapted to be at least one of coupled to and decoupled from the portion of the housing without additional tools.

In any of the embodiments above, the cover can include an annular cover comprising an inner edge, and the inner edge can be positioned inwardly of the at least one process chamber.

Any of the embodiments above can further include at least one first magnetic element operatively coupled to the base plate; and at least one second magnetic element operatively coupled to the cover, the at least one first magnetic element configured to attract the at least one first magnetic element to force the cover in a first direction along the z-axis.

In any of the embodiments above, the first projection can be decoupled from the second projection at least partially in response to the magnetic attraction between the at least one first magnetic element and the at least one second magnetic element.

In any of the embodiments above, the at least one first magnetic element can be arranged in a first annulus, and the at least one second magnetic element can be arranged in a second annulus.

In any of the embodiments above, the second annulus of magnetic elements can include an inner edge and an outer edge, and both the inner edge and the outer edge can be positioned inwardly, relative to the rotation axis, of the at least one process chamber when the sample processing device is coupled to the base plate.

In any of the embodiments above, at least one of the first annulus of magnetic elements and the second annulus of magnetic elements can include a substantially uniform distribution of magnetic force about the annulus.

In any of the embodiments above, the at least one first magnetic element and the at least one second magnetic element can be keyed with respect to one another, such that the cover couples to the base plate in a desired orientation.

Any of the embodiments above can further include a thermal structure operatively coupled to the base plate, wherein the thermal structure comprises a transfer surface exposed proximate a first surface of the base plate, and wherein the magnetic attraction between the at least one first magnetic element and the at least one second magnetic element urges at least a portion of the sample processing device into contact with the transfer surface of the base plate.

In any of the embodiments above, the at least a portion of the sample processing device can include the at least one process chamber.

Another embodiment of the present disclosure can include a method for processing sample processing devices, the method comprising: providing a base plate operatively coupled to a drive system and having a first surface; providing a cover adapted to be positioned facing the first surface of the base plate; providing a housing comprising a portion movable with respect to the base plate between an open position in which the cover is not coupled to the base plate and a closed position in which the cover is coupled to the base plate; positioning a sample processing device on the base plate, the sample processing device comprising at least one process chamber; coupling the cover to the portion of the housing when the portion of the housing is in the open position; moving the portion of the housing from the open position to the closed position; coupling the cover to the base plate at least partially in response to moving the portion of the housing from the open position to the closed position; and rotating the base plate about a rotation axis, wherein the rotation axis defines a z-axis.

In such a method embodiment, coupling the cover to the base plate can include decoupling the cover from the portion of the housing.

In any of the embodiments above, the cover can include a first projection and the portion of the housing can include a second projection, and decoupling the cover from the portion of the housing can include decoupling the first projection from the second projection, such that the cover is free to rotate with the base plate about the rotation axis.

In any of the embodiments above, the cover can include a first projection and the portion of the housing can include a second projection, and decoupling the cover from the portion of the housing can include spacing the first projection a distance from the second projection.

In any of the embodiments above, the cover can include a first projection and the portion of the housing can include a second projection.

In any of the embodiments above, coupling the cover to the portion of the housing can include coupling the first projection to the second projection.

In any of the embodiments above, the first projection can extend a first distance in a first direction in a plane orthogonal to the z-axis, and the second projection can extend a second distance in a second direction substantially parallel and opposite to the first direction, such that the first projection and the second projection overlap.

In any of the embodiments above, the first projection can include a first edge positioned a first distance from a center of the cover, the second projection can include a second edge positioned a second distance from the center of the cover, and the second distance can be greater than the first distance.

In any of the embodiments above, the cover can be in the shape of a circular annulus, wherein the first projection of the cover includes a first radial projection that extends radially inwardly and defines an inner radius measured from a center of the cover, and wherein the second projection includes a second radial projection that extends radially outwardly and defines an outer radius measured from the center of the cover, and wherein the outer radius is greater than the inner radius.

Any of the embodiments above can further include providing at least one first magnetic element operatively coupled to the base plate, and providing at least one second magnetic element operatively coupled to the cover.

In any of the embodiments above, coupling the cover to the base plate can include coupling the at least one first magnetic element and the at least one second magnetic element.

Any of the embodiments above can further include decoupling the cover from the portion of the housing, wherein decoupling the cover from the portion of the housing includes coupling the at least one first magnetic element to the at least one second magnetic element.

Any of the embodiments above can further include rotating the cover with the base plate about the rotation axis when the cover is coupled to the base plate.

In any of the embodiments above, coupling the cover to the portion of the housing can include coupling the cover to the portion of the housing without additional tools.

Any of the embodiments above can further include moving the portion of the housing from the closed position to the open position.

In any of the embodiments above, moving the portion of the housing from the closed position to the open position can include decoupling the cover from the base plate.

In any of the embodiments above, moving the portion of the housing from the closed position to the open position can include coupling the cover to the portion of the housing.

In any of the embodiments above, the cover can include a first projection and the portion of the housing can include a second projection, and moving the portion from the closed position to the open position can include moving the second projection into contact with the first projection.

In any of the embodiments above, the cover can include a first projection and the portion of the housing can include a second projection, and moving the portion from the closed position to the open position can include using the second projection to pick up the cover by coupling the second projection and the first projection.

In any of the embodiments above, the cover can include a first projection and the portion of the housing can include a second projection, and any of the embodiments above can further include using the second projection to hold the cover when the portion of the housing is in the open position.

Any of the embodiments above can further include decoupling the cover from the portion of the housing.

All references and publications cited herein are expressly incorporated herein by reference in their entirety into this disclosure.

Various features and aspects of the present disclosure are set forth in the following claims.

What is claimed is:

1. A system for processing sample processing devices, the system comprising:

a base plate operatively coupled to a drive system and having a first surface, wherein the drive system rotates the base plate about a rotation axis, and wherein the rotation axis defines a z-axis;

a cover adapted to be positioned facing the first surface of the base plate, the cover including a first projection;

a housing comprising a portion movable with respect to the base plate between an open position in which the cover is not coupled to the base plate and a closed position in which the cover is coupled to the base plate, the portion including a second projection, the first projection and the second projection adapted to be coupled together when the portion is in the open position and decoupled from each other when the portion is in the closed position, such that the cover is decoupled from the entire portion of the housing and is configured to rotate with the base plate about the rotation axis when the portion is in the closed position and when the cover is coupled to the base plate; and a sample processing device comprising at least one process chamber and adapted to be positioned between the base plate and the cover, the sample processing device rotatable with the base plate about the rotation axis when the sample processing device is coupled to the base plate.

2. The system of claim 1, wherein the first projection includes a first radial projection that extends in a radial direction.

3. The system of claim 1, wherein the second projection includes a second radial projection that extends in a radial direction.

4. The system of claim 1, wherein the portion of the housing includes a first portion that is movable with respect to a second portion of the housing, and wherein the base plate is positioned in the second portion of the housing.

5. The system of claim 1, wherein the portion of the housing is pivotally movable with respect to the base plate.

6. The system of claim 1, wherein the portion of the housing is slidably movable with respect to the base plate.

7. The system of claim 1, wherein the portion of the housing is movable with respect to the base plate via a gantry system.

8. The system of claim 1, wherein the sample processing device is adapted to be positioned between the base plate and the cover.

9. The system of claim 1, wherein the first projection extends a first distance in a first direction in a plane orthogonal to the z-axis, and wherein the second projection extends a second distance in a second direction substantially parallel and opposite to the first direction, such that the first projection and the second projection overlap.

10. The system of claim 1, wherein the first projection includes a first edge positioned a first distance from a center of the cover, wherein the second projection includes a second edge positioned a second distance from the center of the cover, and wherein the second distance is greater than the first distance.

11. The system of claim 1, wherein the cover is in the shape of a circular annulus, wherein the first projection of the cover includes a first radial projection that extends radially inwardly and defines an inner radius measured from a center of the cover, and wherein the second projection includes a second radial projection that extends radially outwardly and defines an outer radius measured from the center of the cover, and wherein the outer radius is greater than the inner radius.

12. The system of claim 1, wherein the second projection is spaced a distance along the z-axis from the first projection when the portion of the housing is in the closed position, such that the cover is rotatable with the base plate.

13. The system of claim 1, wherein the second projection is movable into contact with the first projection when the portion of the housing is moved from the closed position to the open position.

14. The system of claim 1, wherein the second projection is adapted to pick up the cover by engaging the first projection when the portion of the housing is moved from the closed position to the open position.

15. The system of claim 1, wherein the second projection is adapted to hold the cover when the portion of the housing is in the open position.

16. The system of claim 1, wherein the cover is adapted to be at least one of coupled to and decoupled from the portion of the housing without additional tools.

17. The system of claim 1, wherein the cover includes an annular cover comprising an inner edge, and wherein the inner edge is positioned inwardly of the at least one process chamber.

18. The system of claim 1, further comprising:

at least one first magnetic element operatively coupled to the base plate; and at least one second magnetic element operatively coupled to the cover, the at least one first magnetic element configured to attract the at least one first magnetic element to force the cover in a first direction along the z-axis.

19. The system of claim 18, wherein the first projection is decoupled from the second projection at least partially in response to the magnetic attraction between the at least one first magnetic element and the at least one second magnetic element.

20. The system of claim 18, wherein the at least one first magnetic element is arranged in a first annulus of magnetic elements, and wherein the at least one second magnetic element is arranged in a second annulus of magnetic elements.

21. The system of claim 20, wherein the second annulus of magnetic elements includes an inner edge and an outer edge, and wherein both the inner edge and the outer edge are positioned inwardly, relative to the rotation axis, of the at least one process chamber when the sample processing device is coupled to the base plate.

22. The system of claim 21, wherein at least one of the first annulus of magnetic elements and the second annulus of magnetic elements includes a substantially uniform distribution of magnetic force about the annulus.

23. The system of claim 18, wherein the at least one first magnetic element and the at least one second magnetic element are keyed with respect to one another, such that the cover couples to the base plate in a desired orientation.

24. The system of claim 18, further comprising a thermal structure operatively coupled to the base plate, wherein the thermal structure comprises a transfer surface exposed proximate a first surface of the base plate, and wherein the magnetic attraction between the at least one first magnetic element and the at least one second magnetic element urges at least a portion of the sample processing device into contact with the transfer surface of the base plate.

25. The system of claim 24, wherein the at least a portion of the sample processing device includes the at least one process chamber.

* * * * *